US012807397B2

(12) United States Patent
Goodrich

(10) Patent No.: US 12,807,397 B2
(45) Date of Patent: *Nov. 24, 2026

(54) SHIPPING AND DISPENSING BOX FOR SLIT SHEET MATERIAL

(71) Applicant: David Paul Goodrich, Sedona, AZ (US)

(72) Inventor: David Paul Goodrich, Sedona, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,567

(22) Filed: Mar. 3, 2025

(65) Prior Publication Data

US 2025/0197099 A1 Jun. 19, 2025

Related U.S. Application Data

(63) Continuation of application No. 18/101,200, filed on Jan. 25, 2023, now Pat. No. 12,240,684, which is a (Continued)

(51) Int. Cl.
*B65D 85/672* (2006.01)
*B31B 50/26* (2017.01)
(Continued)

(52) U.S. Cl.
CPC ............ *B65D 85/672* (2013.01); *B31B 50/26* (2017.08); *B31D 5/0065* (2013.01); *B65D 5/42* (2013.01); *B31D 2205/007* (2013.01)

(58) Field of Classification Search
CPC .. B65D 85/672; B65D 5/42; B31D 2205/007; B31D 5/0065; B31B 50/36
See application file for complete search history.

(56) References Cited

U.S. PATENT DOCUMENTS 3,144,970 A 8/1964 Beschmann
3,477,624 A 11/1969 Harshbarger
(Continued)

FOREIGN PATENT DOCUMENTS

CN 101175419 A 5/2008
CN 202609298 U 12/2012
(Continued)

OTHER PUBLICATIONS

International Search Report (ISR) and Written Opinion (WO) in corresponding PCT/US2018/055674, dated May 8, 2019. (Cited in parent U.S. Appl. No. 16/159,186).
(Continued)

*Primary Examiner* — Jacob K Ackun
(74) *Attorney, Agent, or Firm* — Studebaker Brackett PC

(57) ABSTRACT

Exemplary embodiments pertain to a combined shipping and expansion device for shipping a roll of unexpanded slit sheet material and for expanding the slit sheet material. In some examples, the device includes: a container made with recyclable paper or board; a roll of slit sheet material wound around a core member and positioned within the container; the roll of slit sheet material having a slit pattern that forms open cells upon expansion; the core member being made with recyclable paper or board and having a length greater than a width of the roll of slit sheet wound around the core member and having protrusions that extend beyond each side of the roll of slit sheet material; a plurality of yoke members within the container, including at least one yoke member that rotatably receives a first of the protrusions and at least one yoke member that rotatably receives a second of the protrusions; and the container having a dispensing opening through which the slit sheet material wound around the core member can be extended and pulled, causing the core member to rotate relative to the yoke members via
(Continued)

rotation of the roll of slit sheet material. The combined shipping and expansion device is made from substantially entirely recyclable paper or board materials, whereby after complete dispensing of the slit sheet material from the shipping and expansion device, the combined shipping and expansion device can be recycled in a paper recycling facility.

33 Claims, 15 Drawing Sheets

Related U.S. Application Data continuation of application No. 16/740,666, filed on Jan. 13, 2020, now Pat. No. 11,584,585, which is a continuation of application No. 16/159,186, filed on Oct. 12, 2018, now Pat. No. 10,766,690.

(60) Provisional application No. 62/633,630, filed on Feb. 22, 2018, provisional application No. 62/571,382, filed on Oct. 12, 2017.

(51) Int. Cl.
*B31D 5/00* (2017.01)
*B65D 5/42* (2006.01)

(56) References Cited

U.S. PATENT DOCUMENTS

| | | | | |
|---|---|---|---|---|
| 4,238,065 | A | 12/1980 | Ragsdale | |
| 4,298,123 | A | 11/1981 | Roccaforte et al. | |
| 4,549,689 | A | 10/1985 | Bailey | |
| 4,715,519 | A | 12/1987 | Fischer | |
| 5,301,854 | A | 4/1994 | Scobey | |
| 5,884,763 | A | 3/1999 | Ozawa | |
| 6,540,076 | B1 | 4/2003 | Elia et al. | |
| 10,766,690 | B2 * | 9/2020 | Goodrich | B31D 5/0065 |
| 11,584,585 | B2 * | 2/2023 | Goodrich | B65D 5/42 |
| 12,240,684 | B2 * | 3/2025 | Goodrich | B65D 85/672 |
| 2005/0035240 | A1 | 2/2005 | Weck et al. | |
| 2005/0133659 | A1 | 6/2005 | Kemp et al. | |
| 2006/0163419 | A1 | 7/2006 | Horn | |
| 2014/0027553 | A1 | 1/2014 | Page et al. | |
| 2018/0222665 | A1 | 8/2018 | Goodrich | |
| 2023/0022987 | A1 * | 1/2023 | Corrigan | B65D 81/03 |

FOREIGN PATENT DOCUMENTS

| | | | |
|---|---|---|---|
| FR | 2744704 | A1 | 8/1997 |
| JP | 2004131178 | A | 4/2004 |
| JP | 2005-289648 | A | 10/2005 |
| JP | 2007-314213 | A | 12/2007 |
| JP | 2008230669 | A | 10/2008 |
| JP | 2010058825 | A | 3/2010 |
| WO | 2004014761 | A1 | 2/2004 |

OTHER PUBLICATIONS

Notification of Transmittal of Translation of the International Preliminary Report on Patentability (Forms PCT/IB/326) issued in counterpart International Application No. PCT/US2018/055674 dated Apr. 23, 2020. (1 pages). (Cited in parent U.S. Appl. No. 16/159,186).

International Preliminary Report on Patentability (Form PCT/IB/373) issued in counterpart International application No. PCT/US2018/055674 dated Apr. 14, 2020, with Form PCT/ISA/237. (11 pages). (Cited in parent U.S. Appl. Nos. 16/159,186, U.S. Appl. No. 16/740,666 and U.S. Appl. No. 18/101,200.).

Office Action dated Oct. 14, 2020, issued in counterpart CN Application No. 201880066105.3, with English translation (2 pages). (Cited in parent U.S. Appl. No. 16/740,666 and U.S. Appl. No. 18/101,200.).

Extended (Supplementary) European Search Report dated Mar. 30, 2021, issued in counterpart EP Application No. 18865962.8. (8 pages). (Cited in parent U.S. Appl. No. 16/740,666 and U.S. Appl. No. 18/101,200.).

Office Action dated Apr. 16, 2021, issued in counterpart EP Application No. 18865962.7. (1 page). (Cited in parent U.S. Appl. No. 16/740,666 and U.S. Appl. No. 18/101,200.).

International Search Report and Written Opinion dated May 8, 2019, issued in counterpart application No. PCT/US2018/055674. (Cited in parent U.S. Appl. No. 16/740,666 and U.S. Appl. No. 18/101,200.).

Notification of Transmittal of Translation of the International Preliminary Report on Patentability (Form PCT/IB/326) issued in counterpart International application No. PCT/US2018/055674 dated Apr. 23, 2020 (1 page). (Cited in parent U.S. Appl. No. 16/740,666 and U.S. Appl. No. 18/101,200.).

Notification of Reasons for Refusal Office Action issued in JP 2020-517787; mailed by the Japanese Patent Office dated May 10, 2022. (Cited in parent U.S. Appl. No. 16/740,666 and U.S. Appl. No. 18/101,200.).

An Office Action mailed by the Indian Patent Office dated Mar. 17, 2022, which corresponds to Indian Patent Application No. 202017015401 and is related to U.S. Appl. No. 16/740,666 (no newly cited references). (Cited in parent U.S. Appl. No. 16/740,666 and U.S. Appl. No. 18/101,200.).

An Office Action mailed by the Canadian Intellectual Property Office dated Nov. 30, 2021, which corresponds to Canadian Patent Application No. 3,076,699 and is related to U.S. Appl. No. 18/101,200 (no newly cited references). (Cited in parent U.S. Appl. No. 16/740,666 and U.S. Appl. No. 18/101,200.).

Office Action dated Jul. 19, 2021, issued in counterpart CN Application No. 201880066105.3, with English translation. (19 pages). (Cited in parent U.S. Appl. No. 16/740,666 and U.S. Appl. No. 18/101,200.).

Notification to Grant and Search Report issued by the Chinese National Intellectual Property Administration dated Oct. 24, 2022, which corresponds to Chinese Application No. 201880066105.3 and is related to U.S. Appl. No. 18/101,200. (Cited in parent U.S. Appl. No. 16/740,666 and U.S. Appl. No. 18/101,200.).

Extended European Search Report (EESR) dated Jul. 26, 2024, issued in counterpart EP Application No. 23215801.4 (Cited in parent U.S. Appl. No. 18/101,200.).

* cited by examiner

SHIPPING AND DISPENSING BOX FOR SLIT SHEET MATERIAL

The present application is a continuation of U.S. Ser. No. 16/740,666, filed Jan. 13, 2020, which application is a continuation of U.S. Ser. No. 16/159,186, filed Oct. 12, 2018, now U.S. Pat. No. 10,766,690, of inventor David Goodrich, which is a non-provisional of prior U.S. provisional application No. 62/571,382, filed Oct. 12, 2017 and prior U.S. provisional application No. 62/633,630, file Feb. 22, 2018, the entire disclosures of which four prior applications are all incorporated herein by reference.

BACKGROUND

Technical Field

The preferred embodiments relate to, e.g., the use of a corrugated box and tensioning device made from paper able to be completely recycled when discarded.

The Background Art

There have been a number of devices to dispense expanded slit sheet material. Each device has plastics or metals or wood to provide the tensioning required to simultaneously feed and expand the expandable slit sheet material.

SUMMARY

The preferred embodiments advantageously overcome shortcomings of the above and other background art.

In accordance with some embodiments of the invention, the use of a shipping box and tensioning device, made completely of paper, enables them both to be completely recycled when the expanded slit sheet material has been fully dispensed.

According to some embodiments of the invention, a combined shipping and expansion device for shipping a roll of unexpanded slit sheet material and for expanding the slit sheet material is provided that includes: a) a container having: a first pair of side wall members; a second pair of side wall members; a bottom panel; and a top cover panel; b) a roll of slit sheet material wound around a core member and positioned within the container; c) the roll of slit sheet material having a slit pattern that forms open cells upon expansion; d) the core member having a length greater than a width of the roll of slit sheet wound around the core member and having protrusions that extend beyond each side of the roll of slit sheet material; e) a plurality of yoke members within the container, including at least one yoke member that rotatably receives a first of the protrusions and at least one yoke member that rotatably receives a second of the protrusions; and f) a friction member arranged to apply frictional pressure against at least one of the protrusions for regulating force required to rotate the roll with respect to the yoke members during unwinding of the roll of slit sheet material from the core member.

In some examples, the core member is a hollow paper tube and the container is formed from corrugated board. In some examples, the yoke members each have an arcuate opening with a radius of curvature that is substantially equal to a radius of the core member. In some examples, the at least one yoke member that rotatably receives the first of the protrusions and the at least one yoke member that rotatably receives the second of the protrusions each include two adjacent yoke members for increased support of each of the protrusions.

In some examples, the adjacent yoke members are separate yoke panels that are placed adjacent one another, with a first of the adjacent yoke panels folded downward over a second of the adjacent yoke panels. In some examples, the first of the adjacent yoke panels includes an extension tab that is received within a receiving slot formed in or proximate the bottom panel, locking the first of the adjacent yoke panels folded downward over the second of the adjacent yoke panels.

In some examples, each of the yoke members being formed on respective contiguous panels connected to the first pair of panels, each of the contiguous panels including a respective one of the arcuate openings, and each of the contiguous panels being folded to a position overlying a respective panel of the first pair of panels such that its respective the arcuate opening is arranged to receive a respective one of the protrusions of the core member.

In some examples, the roll of slit sheet material is positioning within the combined shipping and expansion device and with each of the cylinder protrusions in contact with a respective one of the arcuate openings. In some examples, a first of the second pair of side wall members has an elongated tear-away region extending from a position proximate a first of the second pair of side wall members to a position proximate a second of the second pair of side wall members.

In some examples, the top cover panel being movably mounted above the roll of slit sheet material within the container and being movable to apply pressure to the friction member, and releasable affixing means for releasably affixing the top cover panel with respect to the friction member to regulate the force required to rotate the roll with respect to the yoke members during unwinding of the roll of slit sheet material from the core member. In some examples, the releasable affixing means includes a releasable attachment mechanism that includes at least a portion substantially directly above the core. In some examples, the releasable affixing means includes two releasable attachment mechanisms located proximate opposite sides of the container.

In some examples, the friction member is a tensioning panel having an arcuate surface configured to be pressed against an upper surface of the core. In some examples, the tensioning panel has a through-hole opening that receives one of the protrusions of the core, and wherein the through-hole opening completely surrounds a perimeter of the core such as to be retained by the core. In some examples, the tensioning panel has an elongated slot that extends through a side edge of the tensioning panel such that the tensioning panel is laterally slidable with respect to a protrusion of the core with the protrusion received within the elongated slot. In some examples, the releasable affixing means is a releasable adhesive, and, in some examples, the releasable affixing means is hook and loop fasteners. In some examples, the friction member arranged to apply frictional pressure against at least one of the protrusions includes a tensioning member configured to slidingly move within the container, the tensioning member having an arcuate surface configured to be positioned against the at least one of the protrusions for applying pressure against the at least one of the protrusions. In some examples, the top cover panel is variably movable against a pressing surface of the tensioning member that is opposite to the arcuate surface, whereby the top cover can be moved to increase a force against the pressing surface and increase the pressure applied by the arcuate surface against the at least one of the protrusions.

In some examples, the top cover panel has at least one depending tab member positioned to contact the pressing surface of the tensioning member when the top cover panel is in a closed position. In some examples, the tensioning device having a height that is less than an interior height of the container such that the tensioning device applies pressure to the at least one of the protrusions without contacting the bottom panel. In some examples, the invention further includes at least one removable spacer, the at least one removable spacer being positioned between ends of the roll of slit material and the first pair of panels of the container to stabilize the roll of slit material during shipping of the combined shipping and expansion device. In some examples, the at least one removable spacer includes an elongated slot that extends from an open first end to an arcuate shaped end, thereby forming an elongated channel having an arcuate end, the arcuate end being positioned around the at least one of the protrusions. In some examples, the at least one spacer includes a packing member having downwardly extending panels placed at each end of the roll. In some examples, the at least one spacer includes two spacers, with a respective one of the spacers placed at each end of the roll.

In some examples, the slit sheet paper is extensible and has an extensible range from 1-9% in a machine direction and 1-5% in a cross direction. In some examples, the extensible paper has an extensible range from 1-6% in the machine direction and 1-4% in the cross direction. In some examples, the extensible paper has an extensible range from 1-4% in the machine direction and 1-3% in the cross direction. In some examples, the slit sheet is expandable by applying an expansion force in a range from 0.15 to 0.22 pounds per inch, to form at least one expanded sheet having an array of hexagonal cells. In some examples, the slit sheet paper is a paper having a weight in a range from about 30 to 40 pounds per 3,000 square feet.

According to some other embodiments, a combined shipping and expansion device for shipping a roll of unexpanded slit sheet material and for expanding the slit sheet material is provided that includes: a) a container made with recyclable paper or board; b) a roll of slit sheet material wound around a core member and positioned within the container; c) the roll of slit sheet material having a slit pattern that forms open cells upon expansion; d) the core member being made with recyclable paper or board and having a length greater than a width of the roll of slit sheet wound around the core member and having protrusions that extend beyond each side of the roll of slit sheet material; e) a plurality of yoke members within the container, including at least one yoke member that rotatably receives a first of the protrusions and at least one yoke member that rotatably receives a second of the protrusions; and f) the container having a dispensing opening through which the slit sheet material wound around the core member can be extended and pulled, causing the core member to rotate relative to the yoke members via rotation of the roll of slit sheet material; wherein the combined shipping and expansion device is made from substantially entirely recyclable paper or board materials, whereby after complete dispensing of the slit sheet material from the shipping and expansion device, the combined shipping and expansion device can be recycled in a paper recycling facility.

According to some further embodiments, a method of using the combined shipping and expansion device according to the present invention includes: a) shipping the combined shipping and expansion device to a location of a user; and b) at the location of the user, manually pulling the slit sheet material outward through the dispensing opening and expanding the slit sheet material.

In some examples, the method further includes after fully dispensing the slit sheet material from the container delivering the combined shipping and expansion device to a paper recycling facility. In some examples, the method further includes after fully dispensing the slit sheet material from the container disposing of the combined shipping and expansion device, whereby the combined shipping and expansion device is used as a single-use shipping and expansion device. In some examples, the method further includes that the disposing of the combined shipping and expansion device includes delivering the combined shipping and expansion device to a paper recycling facility for recycling. In some examples, the method further includes providing the container with an elongated tear-away region that covers the dispensing opening during the shipping, and further including removing the tear-away region prior to the manually pulling and expanding.

In some examples, the method further includes applying pressure on the core member during the manually pulling and expanding with a tensioning device that frictionally contacts at least one of the protrusions of the core member.

In some examples, the method further includes adjustably increasing pressure upon the core member via the tensioning device by adjustably positioning of an adjustable panel of the container.

In some examples, the adjustable panel of the container is a cover of the container and adjustably positioning the cover using a releasable affixing means.

In some examples, the method further includes stabilizing the roll of slit material during the shipping with respect to the core member with at least one spacer located proximate opposite ends of the roll of slit material, and removing the at least one spacer prior to the manually pulling and expanding.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention will be described with reference to the accompanying drawings, in which.

DETAILED DESCRIPTION OF THE PREFERRED EMBODIMENTS

Figure 1:
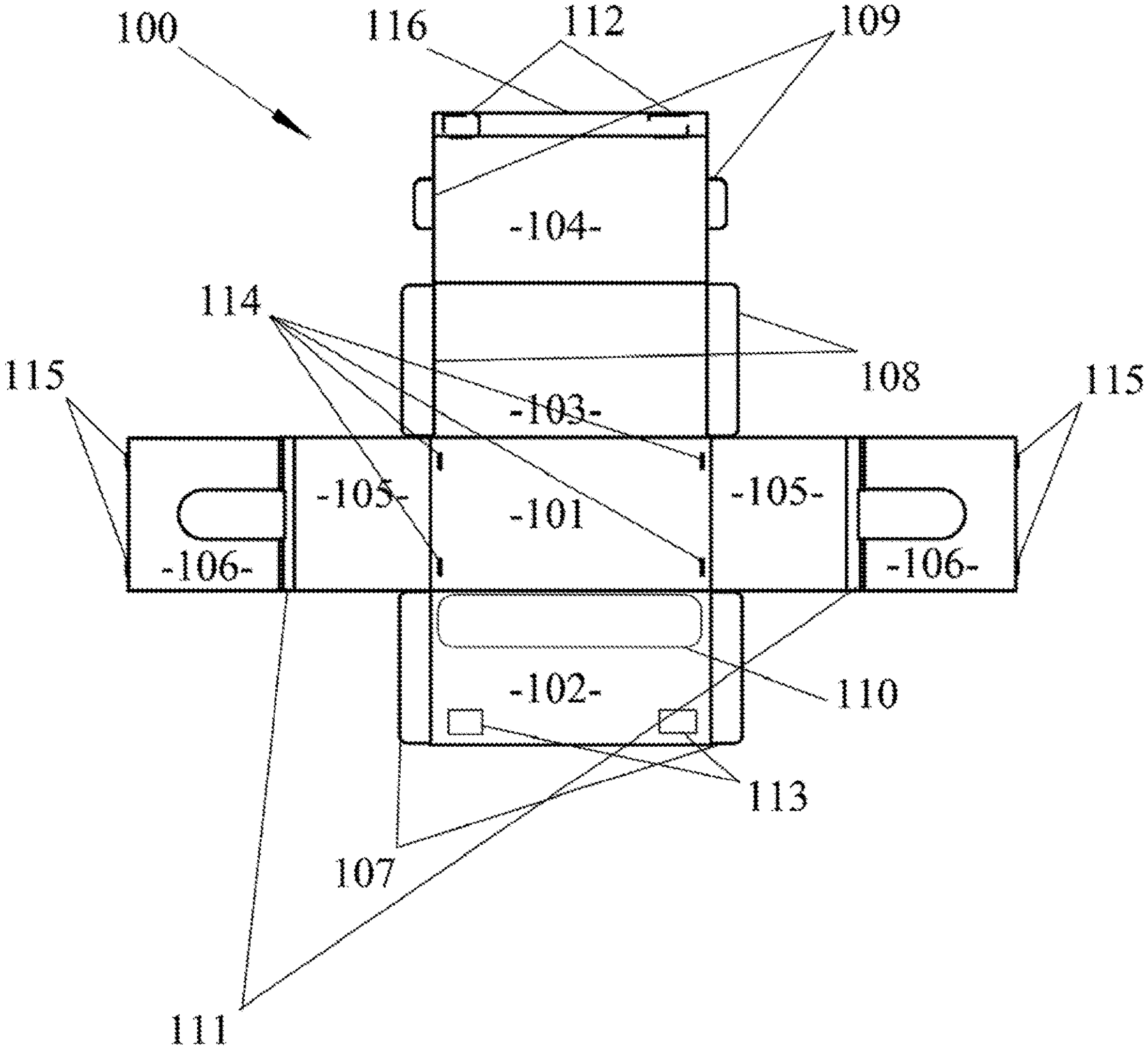
FIG. 1 is a top view of a shipping box ("box") blank as it exits the manufacturing process prior to folding according to some embodiments.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Definitions

In this application, the following terminology should be interpreted based on the definitions set forth below.

For the purposes of the present application, the term "Hexacomb" (employed in light of the product trademark Hexacomb®) means a panel constructed of two paper sheet housing vertical hexagonal cells that can be manufactured in various thicknesses to fill gaps.

For the purposes of the present application, the descriptions and terminology in relation to the paper and slit patterns within the embodiments set forth in U.S. Pat. No. 5,667,871, are applicable to some preferred embodiments in this present application.

For the purposes of the present application, the term "telescope" means a lateral movement of a roll of paper along an axis of the core member, including minimal lateral movement at the region of the roll having the smallest diameter (i.e., closer to the core member) and larger lateral movement at the region of the roll having the largest diameter (i.e., further from the core member). The tendency to telescope is due, in part, to the unexpanded slit sheet paper having a narrower width than the paper core around which the slit sheet paper is wound.

For the purposes of the present application, the term "paper core" means a round paper tube around which an expanded slit sheet paper is wound.

For the purposes of the present application, the term "cylinder" as employed herein, means an elongated member or tube having a solid or hollow circular cross-section.

For the purposes of the present application, the term "contiguous" means that two parts are connected in a continuing sequence, such as, e.g., by a solid or perforated fold line.

For the purposes of the present application, the term "expandable" as applied to paper sheets, means a paper having a slit pattern that enables the paper to be expanded by opening of the slits upon applying a force in a longitudinal direction of the paper sheet.

Further information relating to the paper, slit patterns, and the expansion process which can be used in some embodiments of the present invention is found in: a) the following U.S. Pat. Nos. 5,538,778; 5,667,871; 5,688,578; 5,782,735; 3,908,071; 3,104,197; 3,220,116; 3,266,972; 3,269,393; 3,908,071; 6,024,832; 6,458,447; and 6,712,930; b) the following international PCT application(s): WO 1984002936A1; and c) the following U.S. published applications: 2014/901977; 2002/0060034; and 2007/0240841, the entire disclosures of which patents and applications are all incorporated by reference herein, as though recited herein in full.

In addition, the entire disclosures of U.S. Publication 2018/0127197-A1 (U.S. application Ser. No. 15/820,514), U.S. Publication 2018/0222665 A1 (U.S. Application Ser. No. 15/428,144) and U.S. Provisional Application 62/524,905 (filed as U.S. Non-Provisional application Ser. No. 16/018,702, and internationally published as PCT/US2018/039416) are incorporated by reference herein in their entireties as if recited herein in full as part of the description of the present invention.

Application PCT/US2018/039416 describes a use of extensible paper to greatly reduce the tension required to stretch the slit sheet material. It is particularly useful for the new art shipping box and tensioning device of this application to utilize the extensible paper of the PCT/US2018/039416 application in some preferred embodiments. Although such extensible paper is employed in some preferred embodiments, as described herein other papers can be employed in other embodiments.

For the purposes of the present application, the term "extensible" as applied to paper sheets means a paper sheet that is able to stretch in a longitudinal direction of the paper sheet upon applying a force In the longitudinal direction of the paper sheet. Illustrative extensible sheets are disclosed in U.S. Pat. No. 3,908,071, U.S. patent application Ser. No. 14/901,977 (U.S. Pat. No. 9,945,077), International Application No. WO 1984002936, U.S. Publication Nos. 2002/0060034, 2007/0240841 (U.S. Pat. No. 7,918,966), and U.S. Pat. Nos. 3,104,197, 3,220,116, 3,266,972, 3,269,393, 3,908,071, 6,024,832, 6,458,447, and 6,712,930, the entire disclosures of which are incorporated by reference herein, as though recited herein in full. It should be understood that the stretching of an extensible paper must be measured in an unslit sheet of paper. As disclosed in U.S. Pat. No. 3,266,972, the test and characterization procedures employed in measuring elongation (extensibility) properties can be in accordance with standard TAPPI test Elongation T457. In addition, as disclosed in U.S. Pat. No. 3,266,972, the expression "extensible papers" means a paper having an increasable elongation in the machine direction as compared to standard, non-extensible Kraft paper.

For the purposes of the present invention the term "extensible slit sheet paper" means a paper that is both extensible and expandable. In accordance with another embodiment of the invention, the use of extensible paper reduces the tendency of the slit paper to tear during the expanding of the expandable slit sheet paper without negating the ability to tear the expanded slit sheet paper from the roll of expandable slit sheet paper at the end of the wrapping step.

Detailed Description

In accordance with some preferred embodiments of the invention, an expanded slit sheet paper is employed that is made with an extensible paper that, e.g., advantageously substantially reduces a pulling force necessary to expand the expanded slit sheet material. Among other benefits, this reduced pulling force leads to a variety of very substantial benefits, including that it avoids previously required complex resistant devices that were previously necessary and opens the market to smaller manual expansion devices that can be made to be almost completely recyclable, In some preferred embodiments, machine direction extensibility ranges of the extendible slit sheet paper can have ranges of:

a) from 1.5%-9%, or more preferably from 1.5% to 6%, or even more preferably from 1.5% to 4%; or
b) from 2%-9%, or more preferably from 2% to 6%, or even more preferably from 2% to 4%; or
c) from 3%-9%, or more preferably from 3% to 6%, or even more preferably from 3% to 4%.

In some preferred embodiments of the present invention, the extensible paper that is employed has low extensible properties as compared to other types of extensible papers. In this regard, an optimal extensible paper enables a smooth transition from an unexpanded to the expanded slit sheet by providing a small amount of stretching at the very start of expansion of the extensible slit sheet paper material.

In accordance with a broad embodiment of the invention, the use of extensible paper reduces the pulling force necessary to stretch the expanded slit sheet material and thereby expands the market to include, e.g., void fill usage and lighter weight papers for greater cushioning effect for very fragile items.

In accordance with another embodiment of the present invention, an extensible slit sheet paper product is produced having a slit pattern that forms open cells upon expansion of the paper product. In some preferred embodiments, the paper product is an extensible paper having an extensibility in the range from 1-9% in the machine direction and 1-5% in the cross direction. Preferably, the extensible paper has an extensible range from 1-6% in the machine direction and 1-4% in the cross direction. Most preferably, the extensible paper has an extensible range from 1-4% in the machine direction and 1-3% in the cross direction.

In accordance with some preferred embodiments of the present invention, an extensible slit sheet paper product is produced having a slit pattern that forms open cells upon expansion of said paper product, wherein said slit sheet is expandable by applying an expansion force in the range from 0.15 to 0.22 pounds per inch, to form at least one expanded sheet having an array of hexagonal cells and where the extensible paper has an extensible range from 1-6% in the machine direction and 1-4% in the cross direction.

For the purposes of expanding the slit sheet paper for use as a packaging wrap, it has been found that cross direction extensible ranges from 1%-5% provides an adequate extensibility, with ranges of 1% to 4% being more preferred, and with ranges of 1% to 3% being most highly preferred.

In some alternative embodiments, cross direction extensibility ranges of the extendible slit sheet paper can have ranges of:

a) from 1.5%-5%, or more preferably from 1.5% to 4%, or even more preferably from 1.5/o to 3%; or
b) from 2%-5%, or more preferably from 2% to 4%, or even more preferably from 2% to 3%.

In some preferred embodiments, a shipping box with an integrated dispenser is provided. In preferred embodiments, a shipping box with such an integrated dispenser has particular utility and advantages when combined with an extensible paper because of, e.g., the ease of expansion of the extensible paper. Among other things, this can expand the market to customers that use a very small amount of wrap as compared to the industrial market.

Additionally, employment of extensible paper in preferred embodiments also enhances the ease of use by the packer by providing for less ripping during the wrapping process that occurs when the tension is not properly set. As the roll of expanded slit sheet becomes smaller and lighter, there is an increased requirement to increase the tension. With the use of the extensible paper, the tension required is significantly decreased and the strength of the paper is increased. Both benefit the person wrapping by making the tensioning required much less precise, even to the point at which a single tension setting can be used with little or no adjustment. If the tension is set higher than necessary, the increase in strength from the extensible paper keeps the product from tearing and, therefore, makes it easier for the packer to use. Therefore, the packer can make fewer adjustments as the slit sheet roll becomes smaller and smaller (i.e., as the paper is unwound from the roll, reducing the diameter of the remaining paper on the roll).

In some preferred embodiments, a shipping box ("box") and tensioning device is made from paper and, most preferably, made from corrugated paper.

In the preferred embodiments, the shipping box is also the dispenser/expander of the slit sheet material with tensioning adjustments made using the top flap in combination with two hook and loop strips that hold the tension adjustment in place that presses on the tensioning devices.

Figure 2:
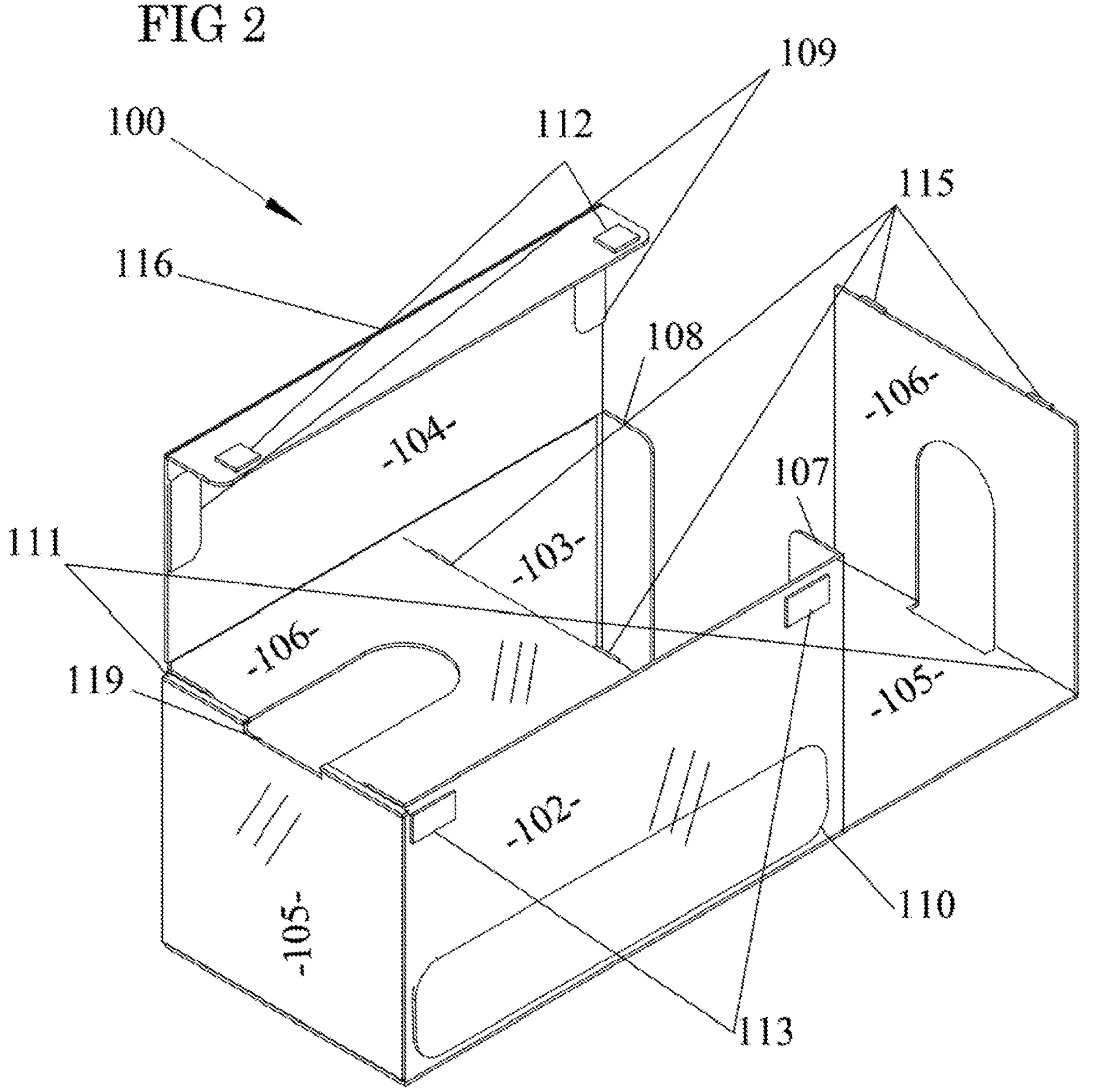
FIG. 2 is a perspective view of the shipping box shown in FIG. 1 partially folded.
Figure 5:
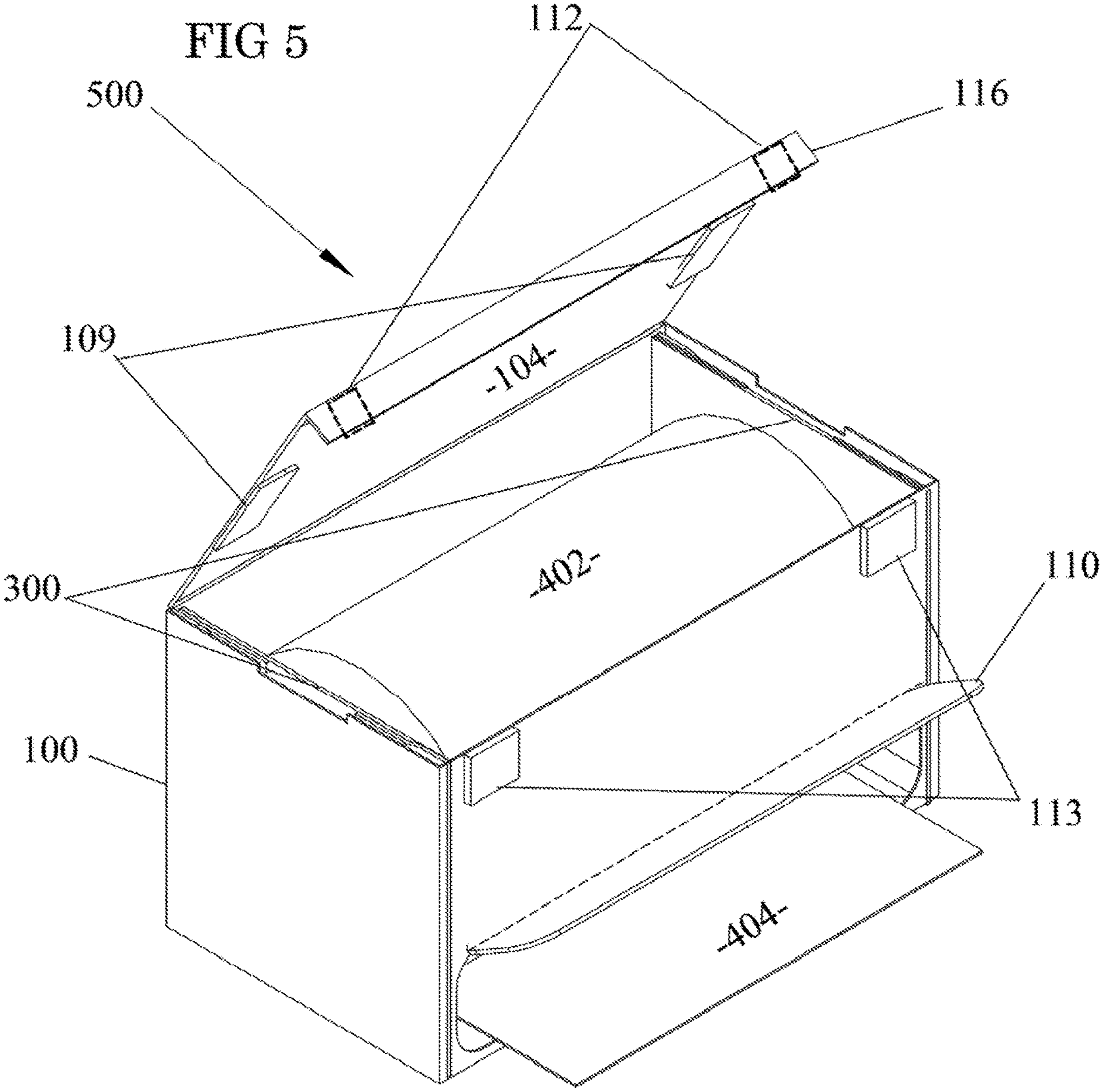
FIG. 5 is a perspective view of the shipping box loaded with the slit sheet roll and tensioning devices ready for use.
Figure 6:
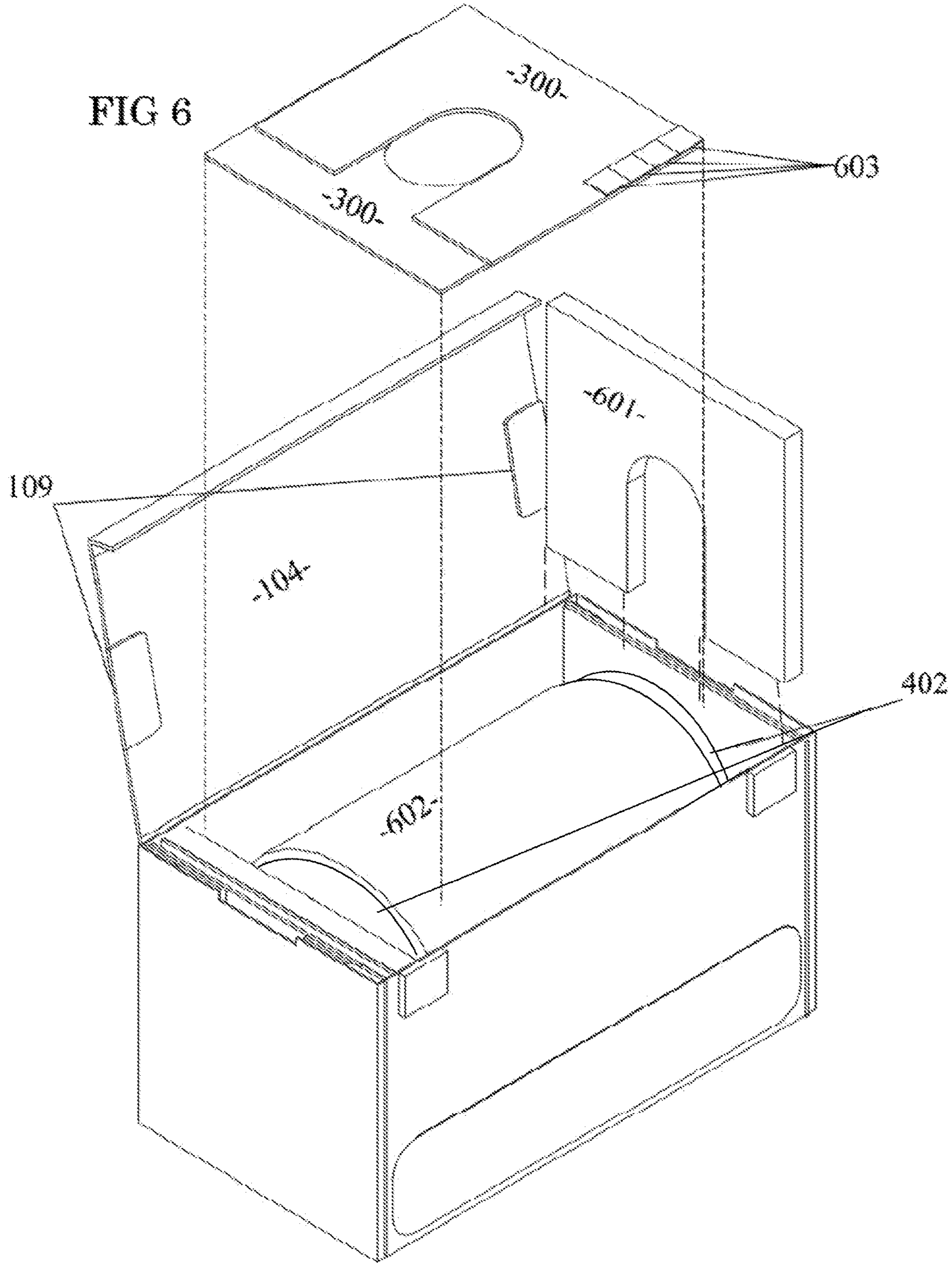
FIG. 6 is a perspective view of the shipping box being prepared for shipment.
Figure 7:
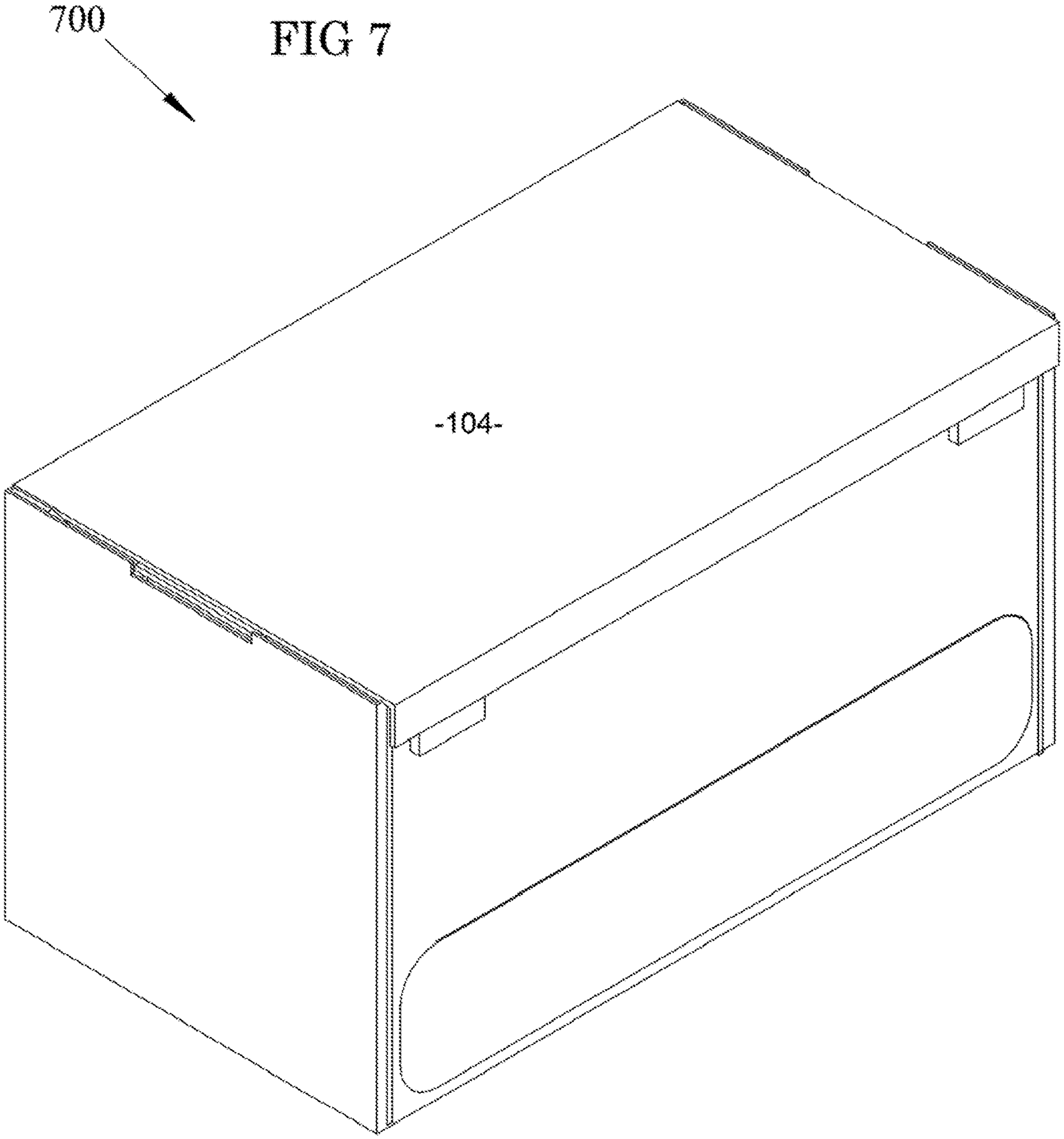
FIG. 7 is a perspective view of the closed shipping box ready for shipment.
Figure 8:
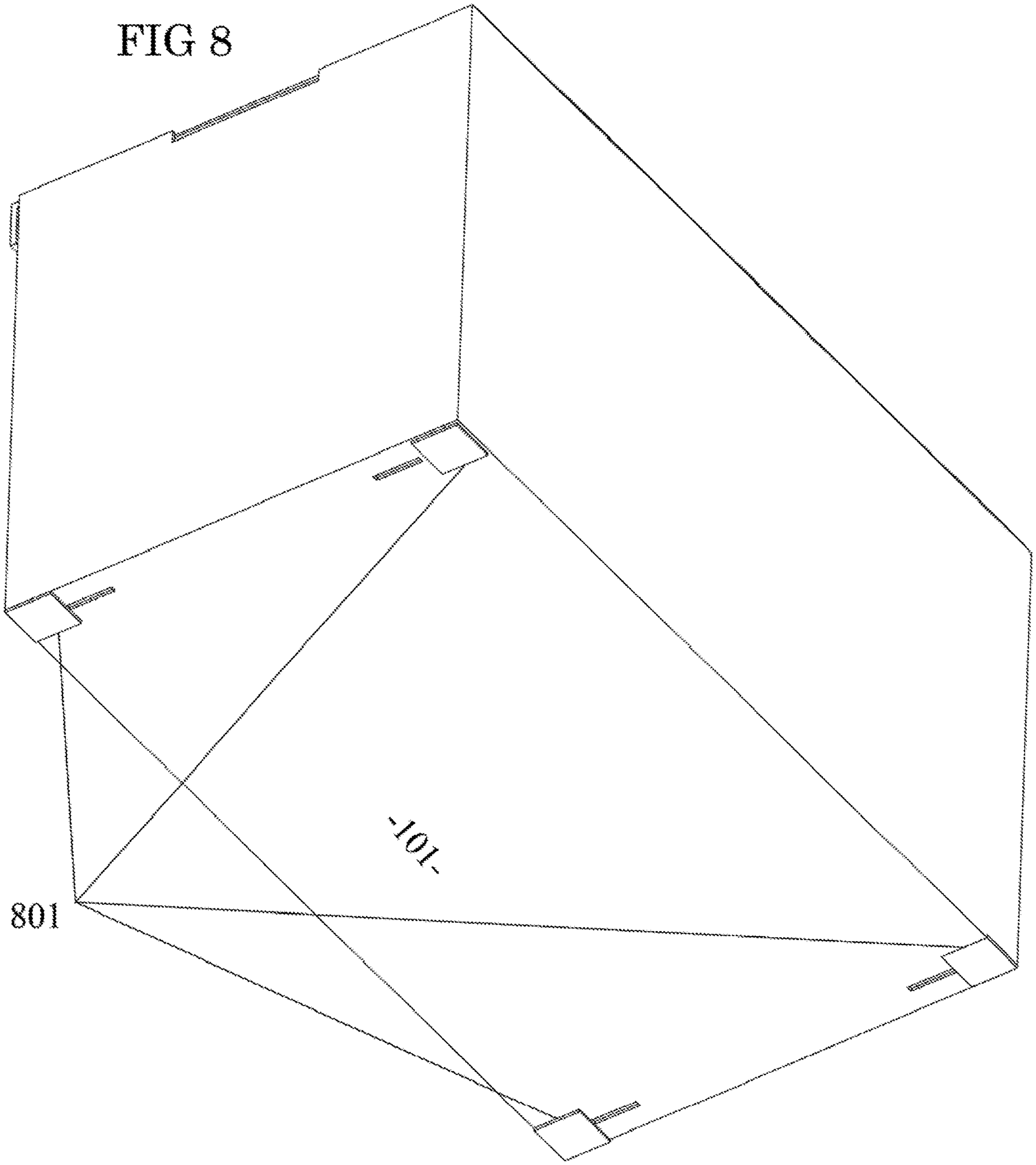
FIG. 8 is a perspective view of the bottom of the shipping box with the double-sided adhesive attached.

In some preferred embodiments, a method by which a shipping box is prepared to be used includes the following steps:

(1) The top cover 104 of FIG. 7 is opened and spacers 601 and double-sided adhesive strips 603, as found in FIG. 6, are removed.
(2) Tensioning devices are placed between yokes 106 of FIG. 1 and slit paper roll 402 of FIG. 4, on both sides.
(3) Double-sided adhesive strips 801 are attached to the bottom of the shipping box as shown in FIG. 8.
(4) Tear-away strip 110 of FIGS. 1 and 2 is removed from the front panel 101 of FIG. 1.
(5) Expanded slit sheet material 602 shown in FIG. 6 (i.e., which is optionally used as a protective padding around at least a portion of the roll 402 during shipping) is removed. In some examples, it is removed from under the open top cover 104. In some embodiments, it can be removed by unwinding the slit sheet roll 402 shown in FIG. 5 and feeding the expanded slit sheet material 602 through the tear-away opening 110 shown in FIG. 2 until the expanded material 602 shown in FIG. 6 is fully exits the opening 110 and is clear and the unexpanded slit sheet 404 of FIG. 5 appears.
(6) The top cover 104 of FIGS. 5 and 6 can then be gently closed for the expansion of the full roll of slit sheet material 404 of FIGS. 4 and 5 that requires no tension.
(7) As the slit sheet roll 402 of FIG. 4 becomes smaller, tension will eventually be required and is done so by closing the top cover 104 of FIG. 2 more firmly in a downward manor and using the hook and loop strips 112 and 113 of FIG. 2 to maintain the top cover 104 position.
(8) As more tension is required the top cover 104 of FIG. 2 would be adjusted further downward by un-attaching the hook and loop strips 112 and 113 of FIG. 2 and reattaching them in the new optimum position.

While the use of hook and loop strips is preferred, in other embodiments, other forms of releasable attachment mechanisms can be employed. For example, in some embodiments, a releasable adhesive can be employed, wherein an adhesively attached closure can be repeatedly opened and resealed. In some examples, a number of appropriate release coatings may be used in some embodiments of the present invention. In some examples, resealable closures can employ features as shown in the following references, which are all incorporated herein by reference in their entireties: G.B. 2147564A; U.S. Pat. No. 2,822,290 (Webber); U.S. Pat. No. 2,880,862 (Sermattei); U.S. Pat. No. 2,985,554 (Dickard); U.S. Pat. No. 4,902,141A (Linnewiel); and U.S. Pub. No. 2002/0164477 (Lonc, et al.).

Other exemplary resealable closures that can be employed in embodiments of the present invention are shown in the U.S. Patents discussed below in this paragraph, the entire disclosures of which are incorporated herein by reference. A first example is shown in U.S. Pat. No. 6,726,054 which is designed for containing breath films or other oral care strips in which the package includes a blister pack having a hinged flap which is resealable against the top surface of the blister pack. The package has a top surface which forms a flange around the perimeter opening of the tray compartment. A second example is shown in U.S. Pat. No. 6,691,886 which includes a plastic tray with a lid film that includes a sealing area around its perimeter which seals to a flange surface of the tray. A third example is shown in U.S. Pat. No. 5,647,506 which shows another resealable container that includes a dispenser for moisture-impregnated articles such as moist tissues using a rigid plastic container with an opening formed in its top surface, wherein a resealable label reseals the top opening.

In preferred embodiments, the hook and loop strips do not interfere with the recyclability of the paper. In some preferred embodiments, the tensioning devices are shipped loose on top of the roll of slit paper within the package and are put in place by the user at the required time—that is, the user preferably installs the tensioning devices when the dispensing is to be commenced.

In some embodiments, when first dispensing the slit sheet paper roll, no tension is necessary. That is, in some embodiments, the initial weight of the roll achieves sufficient frictional resistance to enable expansion of the paper upon pulling by a user without providing additional tension. However, as the roll reduces in weight and diameter during use, the roll will spin more freely due to the decreased weight and require an increasing amount of tension. Thus, in preferred embodiments, a tensioning device is provided.

In some preferred embodiments, the shipping box, tensioning device and the paper core upon which the slit sheet material was wound are recyclable, such that, after use, they can be together discarded by placing in a recycling bin or the like for recycling paper.

In some preferred embodiments, based on the various diameters and weight weights of the slit sheet roll size, the corrugated material can be single or double wall walled material. In some preferred embodiments, the shipping box and tensioning device are made from single wall material. In some embodiments, the two yokes 106 of FIG. 1 that support the paper core 403 of FIG. 4, that enables the slit sheet roll 402 of FIG. 4 to rotate, are also be made with single wall material; for example, such a single wall material can be employed in embodiments having an 8-inch diameter paper roll that weighs 10 pounds. On the other hand, in some embodiments having a 10-inch diameter 20-pound roll, double wall walled corrugated yokes can be employed.

Figure 4:
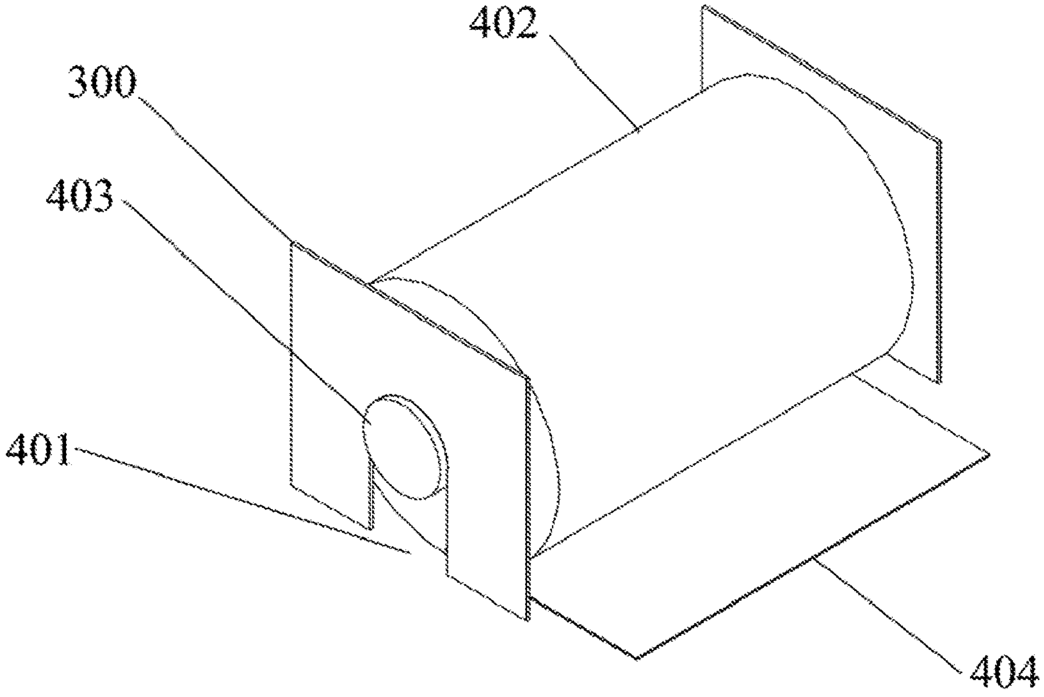
FIG. 4 is a perspective view of the tensioning panel as it rests on an expanded slit sheet roll assembly.
Figure 16:
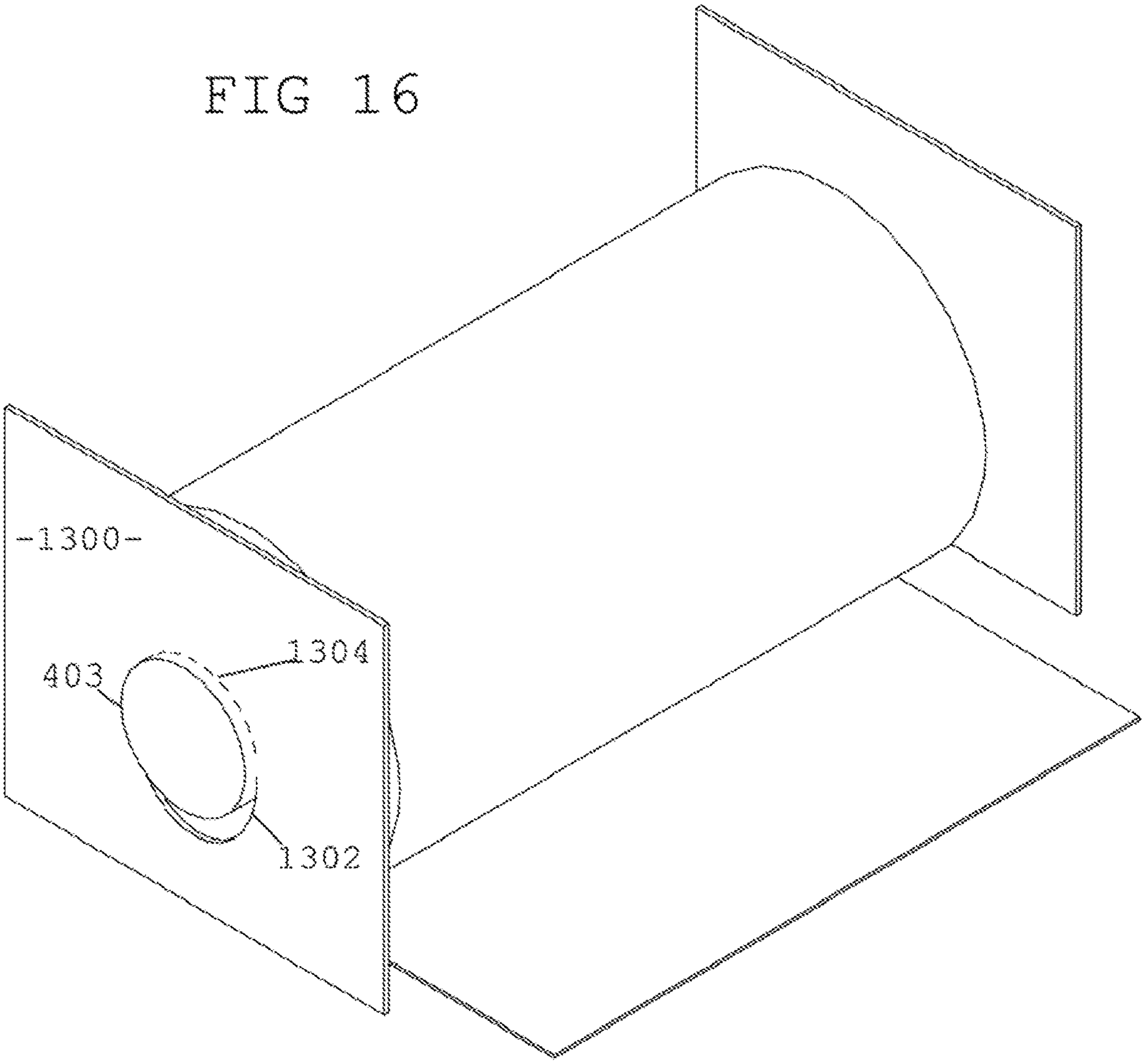
FIG. 16 is a perspective view of an illustrative slit sheet roll wound around a supporting core and the tensioning panel positioned on the core projections.

With reference to FIG. 1, FIG. 1 is a planar view of a shipping box 100 according to some illustrative embodiments after completion of a die-cut manufacturing process. In particular, in some embodiments, a flat sheet is die-cut to the form shown in FIG. 1. Then, the sheet is folded to create the shipping box 100. In some embodiments, the specific order employed to setup the box for use includes that the shipping box bottom 101 is oriented such that side panels 105 are to the left and right of the person setting up the box. Then, the front panel 102 and back panel 103 are lifted so that they are oriented upright (e.g., 90 degrees) from the bottom of panel 101. Then, the vertical interlocking panels 107 and 108 are turned inward towards panel 101 (e.g., by 90 degrees). Then, the side panels 105 are rotated upward to rest against vertically oriented interlocking panels 107 and 108. This leaves yoke panels 106 that are attached to side panels 105 in the vertical position, but that are immediately folded inward and around vertical interlocking panels 107 and 108 with spacer panels 111 becoming the horizontal spacer that rests on top of the interlocking panels 107 and 108. The yoke panels 106 are then locked in place with locking tabs 115 that are placed into receiving holes 114. After the shipping box 100 is setup, the slit paper roll 402 and paper core 403 assembly of FIG. 4 is placed into the box as shown in FIG. 5. For reference, FIG. 16 shows an illustrative paper roll 402 supported on a paper core 403 (i.e., in a similar manner to that shown in FIG. 9 of U.S. 2018/0222665). As illustrated, the paper core 403 is longer in an axial direction (i.e., in a direction transverse to the pulling direction of the paper from the roll (i.e., the widthwise direction) than the paper roll wound on the core, such that opposite ends of the core protrude outwardly from the paper roll 402 wound around the core.

Then, the top cover tabs 109 are folded inward and adhered onto the inner side of top cap 104 as shown in FIG. 2. Preferably, the tear-away flap 110 (shown in FIG. 2) is not removed until the shipping box 100 is used as a dispensing box as shown in FIG. 5. Then, the pads 113 are adhered to the exterior of front panel 113 and loop pads 112 are adhered to the interior of the top folding panel 116.

Figure 3:
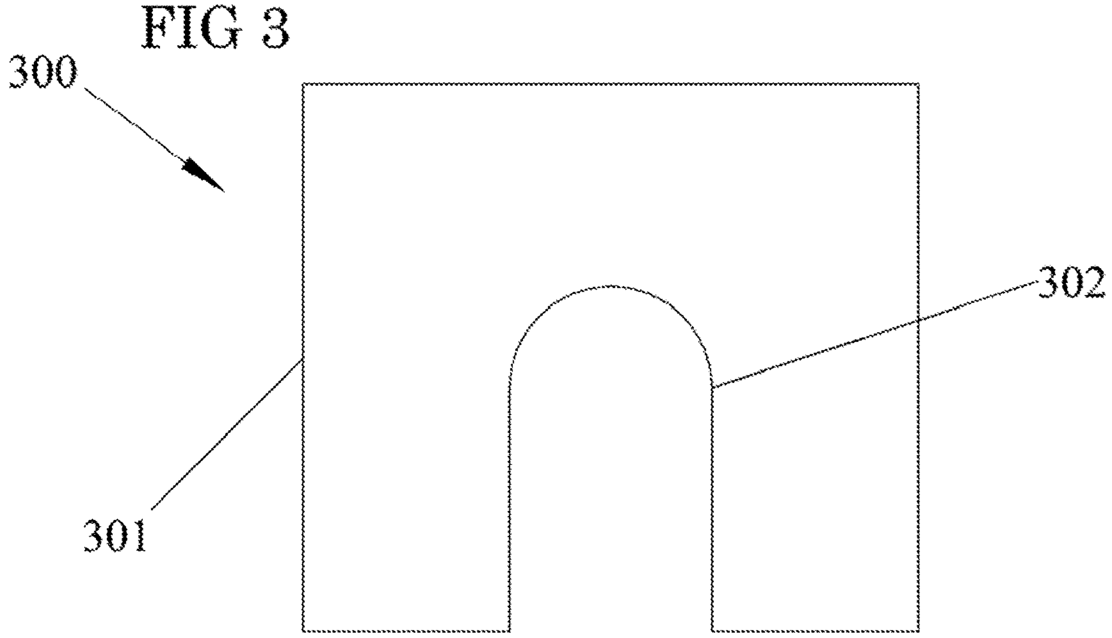
FIG. 3 is a side view of the tensioning panel.

FIG. 2 is a perspective view of a partially constructed shipping box 100 showing shipping box sides 102, 103 and the left lateral side 105 having been first put in the upright position. Then, the left yoke 106, on the left as shown in FIG. 2, is folded over and around the inwardly-folded interlocking panels 107 and 108 with spacer section 111 (i.e., between the side 105 and yoke 106) resting on top. Then, the same process is performed on the right-hand side. The folding flap 116 is then folded inward (e.g., 90 degrees) in relation to the top cover 104. In this manner, the hook and loop pads 112 and 113, respectively, can now be positioned to make contact and connect together when top flap 104 is folded downward and top folding panel 116 is pressed towards and against the front panel 102. Side panels 105 have an additional relief area 119 that enables top cover tabs 109 which, have been folded completely inward, and which are adhered to an underside of the top cover 104, to apply pressure to the tensioning devices 300 as shown in FIG. 3 without interference from side panel 105. In this manner, when the slit sheet roll 402 becomes smaller as it is used (i.e., as paper is dispensed from the roll 402), the tensioning device 300 is pressed downwards to apply a pressure against the core 403 to increase resistance in order to compensate for the smaller (i.e., lighter) slit sheet roll 402, as it is being used up. In the configuration shown in FIG. 2, the tear-away flap 110 is still in its shipping configuration and is still attached to front panel 102.

FIG. 3 is a front view of the tensioning device 300 according to some preferred embodiments. As shown, the tensioning device 300 has a yoke area 302 that is configured to be placed so as to straddle over an extending portion of the paper core 403 as shown in FIG. 4. The side areas 301 of the tensioning device 300 are configured to slide or rub against front panel 101 and back panel 103, respectively, for guidance. This helps to maintain a straight downward pressure. The recess region 302 of the tension device 300 is configured to have a similar radius of curvature to the core 403 and to press against an upper surface of the core member 403 such as to apply a variable frictional resistance to the rotation of the core member 403. That is, the amount of frictional resistance can be adjusted by adjusting the amount of downward pressure that is applied against the tensioning device.

FIG. 4 is a perspective view of the tensioning device 300 as it sits vertically on paper core 403 adjacent to the slit sheet roll 402. In the figure, 401 shows an open area underneath tensioning device 300. This is created by making tensioning device 300 shorter than the total interior height of shipping box 100 to enable constant tension without it hitting the bottom of the box. It should also be appreciated that the bottom surface of the core 403 at ends of the core that extend from the roll 402 are supported within the box 100 upon the respective cut-out openings of the yokes 106. In this manner, the core 403 is supported at a fixed height within the box 100, while the tensioning device 300 can be positionally adjusted with respect to the height of the core 403 to vary the pressure applied by the tensioning device 300 against the core 403.

FIG. 5 is a perspective view of the packaging assembly 500 set up to dispense and provide tension to the slit sheet roll 402. To apply tensioning via the tensioning device 300, the top cover 104 is moved downward from the position illustrated and the folding tabs 109 are pressed against tensioning device 300. The top folding panel 116 is used to lock the tensioning device 300 into position by guiding the hook and loop material 112 and 113 to make contact and lock in place. Notably, in the preferred embodiments, the pads 112 and 113 are sized to enable the vertical positions of the pads 112 with respect to the pads 113 to be variably selected by a user to manually vary the amount of pressure applied via the tensioning device 300. Then, the tear-away sheet 110 is rotated upward or completely removed to enable the slit sheet paper 404 to exit the dispenser system 500. The paper can be unwound from the roll 402 and dispensed through the opening at 404 as shown. Although in some embodiments the paper roll can be dispensed with a clockwise or counterclockwise rotation, in the arrangement as shown in FIG. 5 the paper roll is preferably dispensed with a counterclockwise rotation of the roll 402. More particularly, in the preferred embodiments, the roll 402 is rotated so that the paper is separated from the roll 402 at a lower position of the roll (i.e., proximate to the height of the opening at the tear-away sheet).

With reference to FIG. 6, FIG. 6 shows an illustrative assembly process for preparing the shipping box 100 for shipping. As shown, a roll 402 of expanded slit sheet material is wrapped around a core (not shown in FIG. 6) with the slit sheet material in the roll 402 in an unexpanded state. As shown in FIG. 6, in order to help further protect the roll 402 during shipping, in some preferred embodiments, a padding 602 is inserted within the container during shipping. In some embodiments, the padding 602 can be formed of expanded slit sheet material in an expanded state, and in some embodiments, the padding 602 can be formed of a plurality of layers of such expanded slit sheet material in such expanded state. In the illustrated example, the padding 602 is formed so as to surround the roll and can have a substantially rectangular shape that is bent around the roll 402 as shown. In some embodiments, the padding is sized to substantially entirely surround the circumference of the roll 402. In some embodiments, the padding 602 can surround only a portion of the roll, such as, e.g., an upper surface of the roll. Moreover, in some embodiments, the padding can include a plurality of padding portions, with, e.g., a first padding portion over an upper portion of the roll (e.g., as shown in FIG. 6) and, e.g., a second padding portion under a lower portion of the roll. In the illustrated example, ends of the roll 402 are exposed below the padding. The padding is preferably employed to help fill any gaps around the periphery of the roll 402 and the walls of the container. As shown in FIG. 6, the roll 402 is also preferably sized to substantially fill the container, while the padding 602 helps fill remaining gaps around the roll 402 and the four sides of the shipping box 100. In addition, in the preferred embodiments, thick spacers 601 are preferably provided to fill spaces at the ends of the roll corresponding to the extended portions of the core 403 extending from the roll. In the preferred embodiments, the spacers are made from multiple layers of corrugated paper or Hexacomb® or the like and are placed adjacent to the slit sheet roll 402 and straddling the core 403 in order to prevent telescoping movement of the roll 402 with respect to the core 403 during shipment. In some preferred embodiments, the spacers 601 are made one quarter of an inch shorter than the tensioning device 300 so that the folding tabs 109 do not make contact during shipment. In preferred embodiments, tensioning devices 300 can be placed on top of the expanded slit sheet material or the like padding 602 for storage during shipment, such as schematically depicted in FIG. 6. In some preferred embodiments, double sided adhesive strips 603 can also be placed on top of tensioning devices 300 for later use, such as shown in FIG. 8.

With respect to FIG. 7, FIG. 7 shows an illustrative packing system 700 in a closed state. As shown, the closed slit roll packing system 700 is ready for shipment with the top cover 104 in its closed position.

With respect to FIG. 8, FIG. 8 is a perspective view according to some illustrative embodiments in which the bottom of the shipping box is provided with double-sided adhesive or tape attached to bottom shipping box panel 101. In some preferred embodiments, during use the double-sided adhesive or tape can be used to help stabilize the dispenser on a surface during use. In some implementations, this embodiment can also be used to facilitate stacking and/or stabilizing of a plurality of shipping boxes during shipping or the like. However, in some preferred embodiments, the adhesive or tape would be covered during shipping and only exposed prior to use to provide stability during use.

Figure 9:
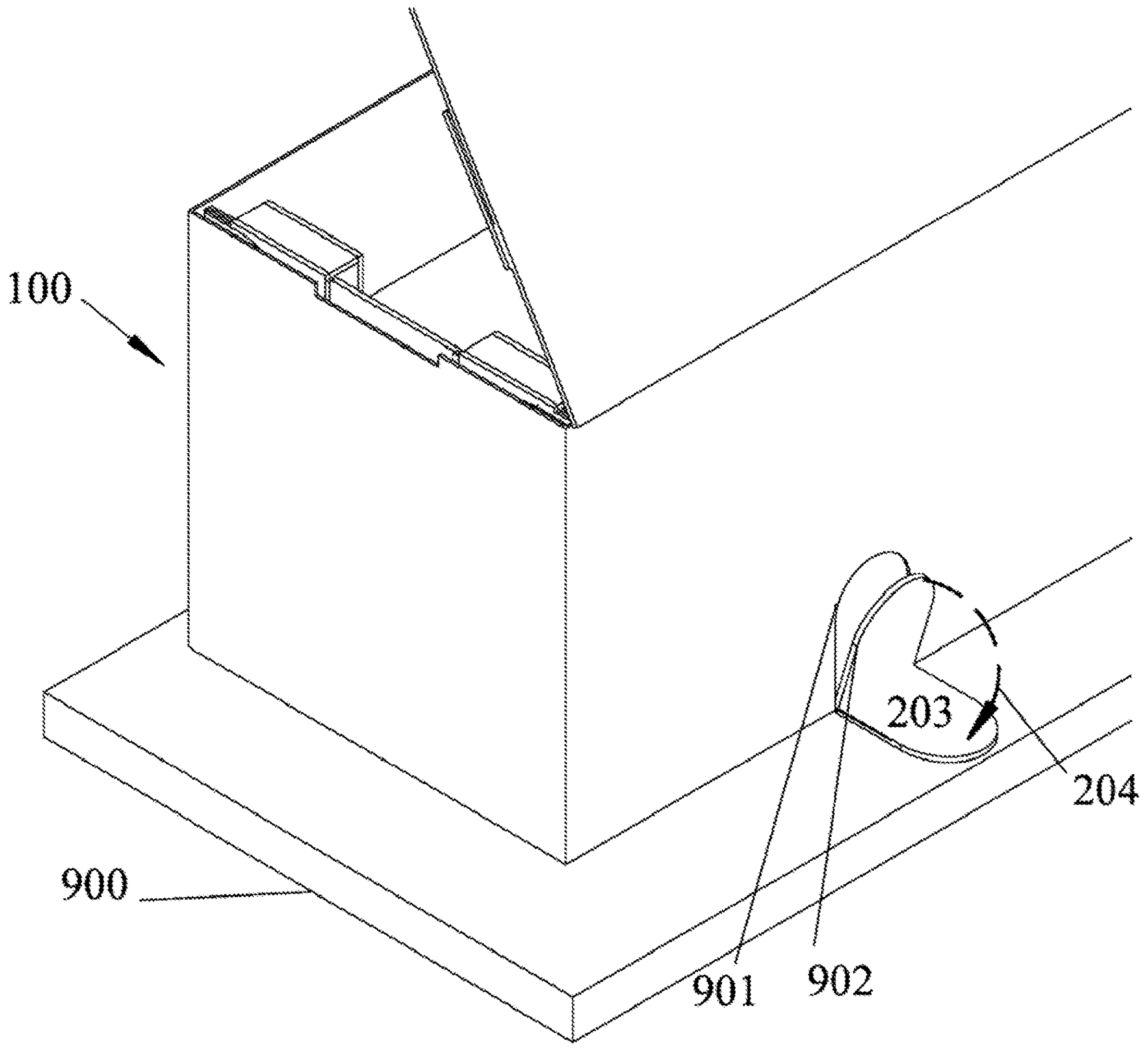
FIG. 9 is a perspective view of the releasable clamping tab found on the back panel of the shipping box.

With respect to FIG. 9, FIG. 9 is a perspective view showing another optional mechanism to facilitate stabilizing of the box during use. As shown, in some embodiments, the back panel of the shipping box 100 and include a clamping tab that is configured to facilitate stabilizing the box on a table during use upon a packing table 900. As shown, in some embodiments, a releasable clamping tab opening 901 is created by folding the releasable clamping tab 902 from an upright position and downward in an arc 204 to a horizontal state resting in a flat position 203 on the table 900.

Figure 10:
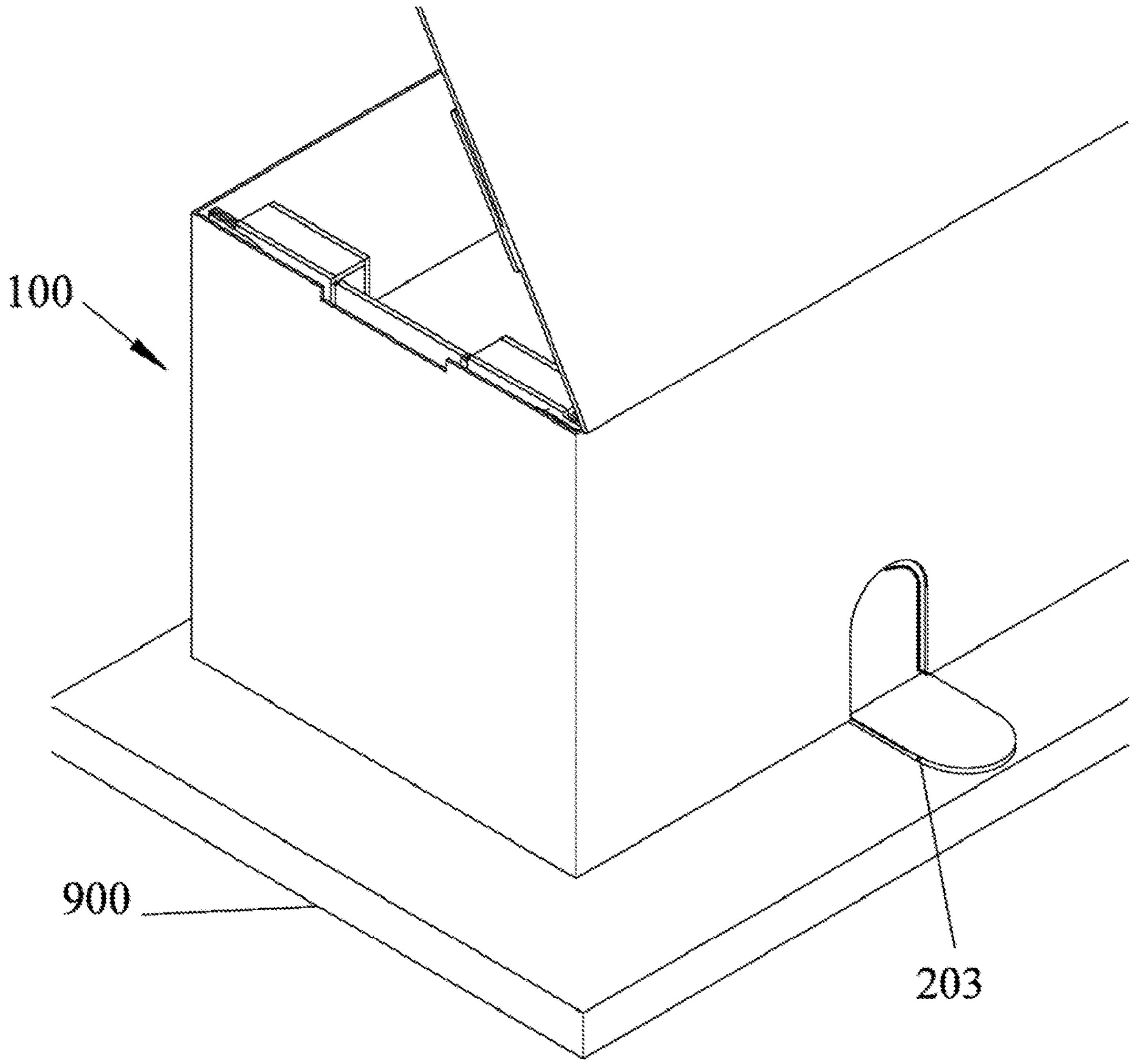
FIG. 10 is a perspective view of the releasable clamping tab in position to receive the clamping device 1100.
Figure 11:
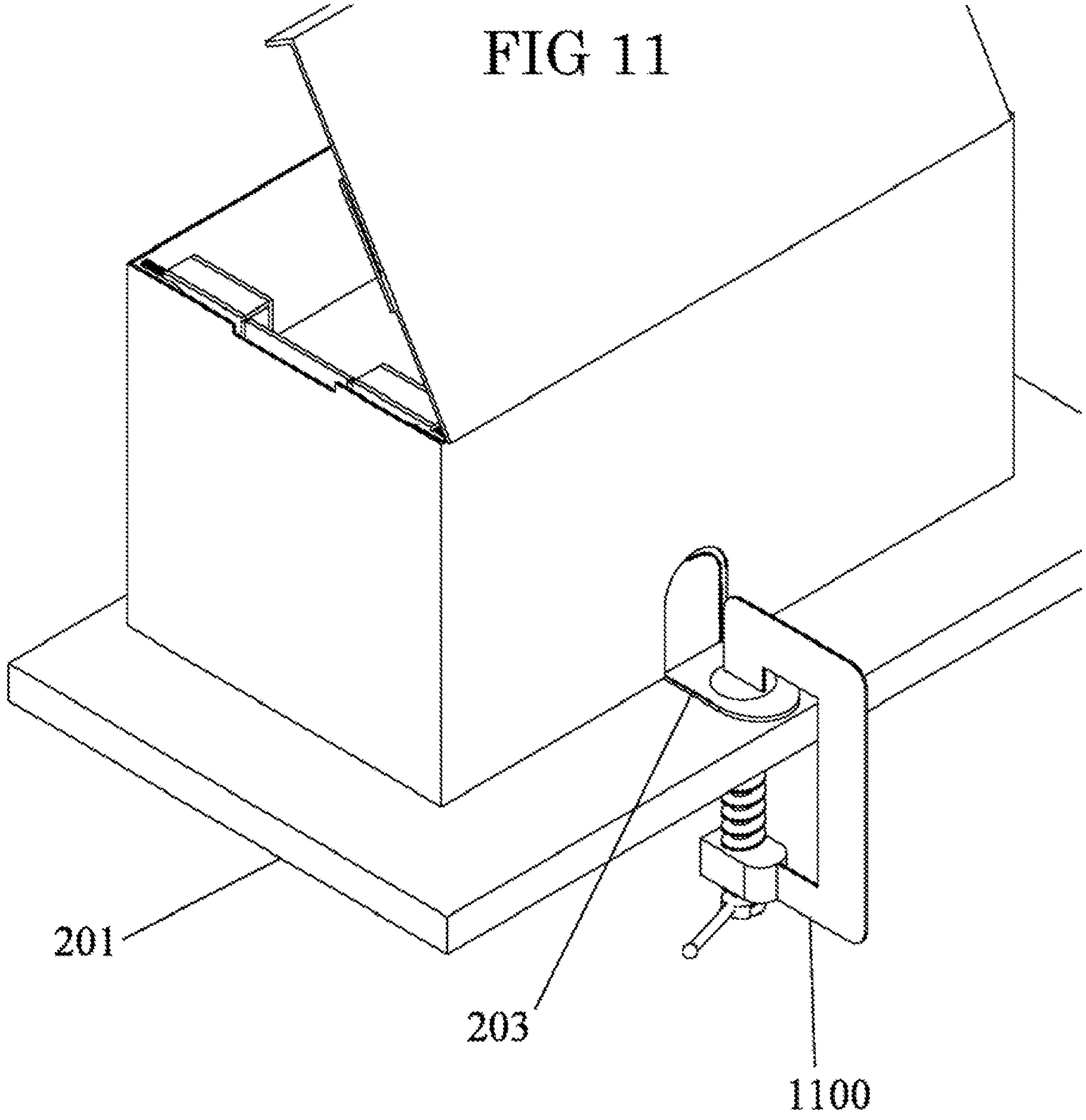
FIG. 11 is a perspective view of the releasable clamping tab 1100 being utilized.

FIG. 10 is a perspective view of the shipping box 100 resting on a table 900 with the releasable clamping tab 203 resting flat on the table, and FIG. 11 is a perspective view of the releasable clamping tab 203 firmly in place with a clamping device 1100 clamping the tab 203 against a packing table 201.

Figure 12:
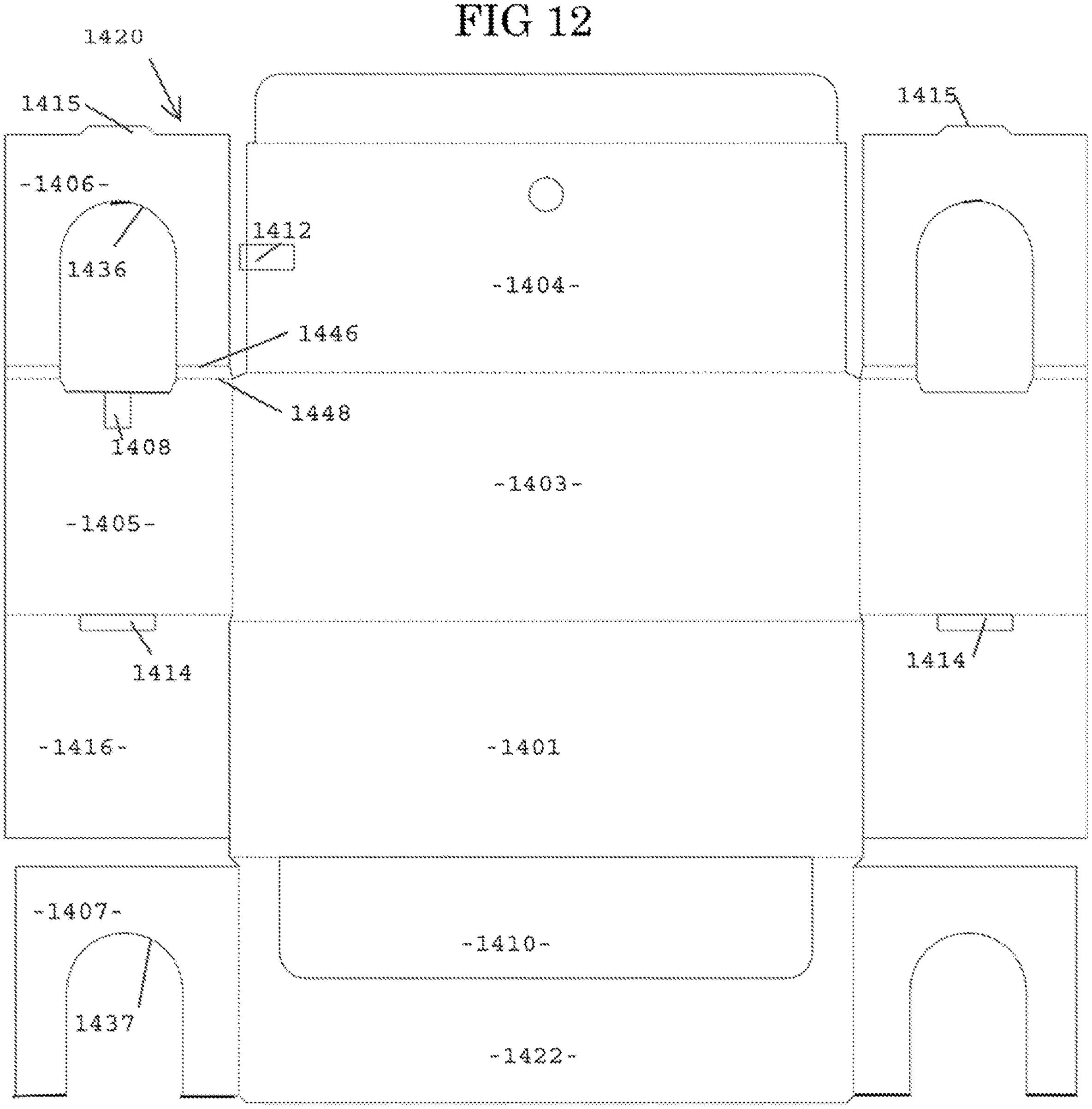
FIG. 12 is a top view of a an alternate embodiment of a shipping box ("box") blank as it exits the manufacturing process prior to folding according to some embodiments.

FIGS. 12-16 show an alternate embodiment of the invention. With reference to FIG. 12, FIG. 12 shows a plan view of a blank 1420 for forming an alternate embodiment of the shipping and dispensing box. In particular, FIG. 12 is a planar view of a shipping box 1420 according to some illustrative embodiments after completion of a die-cut manufacturing process. In some embodiments, a flat sheet is die-cut to the form shown in FIG. 12. Then, the sheet is folded to create the shipping box 1420. In the illustrated example shown in FIG. 12, the dashed lines between contiguous sections depict "folding" areas in which the sections are connected but fold around the illustrated dashed lines. On the other hand, the solid lines depict complete cut edges, such that, e.g., the adjacent panels 1416 and 1401 discussed below are completely separated along the solid lines between the panels and not contiguously connected at such solid lines. In some illustrative embodiments, the blank 1420 can be folded to create the shipping box by initially orienting the blank 1420 such that side panels 1405 are to the left and right of the person setting up the box. Then, the front panel 1422 and back panel 1403 are lifted so that they are oriented upright (e.g., 90 degrees) from the bottom of panel 1401. Then, the interlocking panels 1416 are turned upwards to approach the contiguous panels 1405 and then rotated inwards so as to extend over the bottom panel 1401 (e.g., by rotating the panels 1405 with respect to the panel 1403 by 90 degrees around the dashed line connecting region shown in FIG. 12). At this point, the rear panel 1403 and the side panels 1405 have been rotated to substantially vertical positions, and the interlocking panels 1416 lie flat against the bottom panel 1401.

In this alternative embodiment, the box is configured to include two cooperating yoke portions at each end of the box. In this manner, each extension portion of the core member can be securely supported by two cooperating yoke portions. In this illustrative example, first and second yoke portions are respectively folded to align with one another to form a double-walled yoke at each side of the box. Towards this end, as shown, the yoke panels 1407 are rotated toward the front panel 1422 (e.g., 90 degrees) around the dashed-line region shown. Then, the front panels 1422 and the yoke panels 1407 are rotated upward with the yoke panels resting against the vertically oriented side panels 1405. The yoke panels 1406 are rotated downward to a position overlying the yoke panels 1407, thus forming two cooperating yoke portions formed by a pair of adjacent yoke panels. To further secure the positions of the panels, tabs 1415 are inserted into tab receiving notches 1414, thus locking the shipping/dispenser box 1420 in a secure configuration. As shown in FIG. 12, the adjacent pair of spaced fold lines 1446 and 1448 provide for space to receive the yoke panels 1407 in between the yoke panels 1406 and the side panels 1405.

Figure 13:
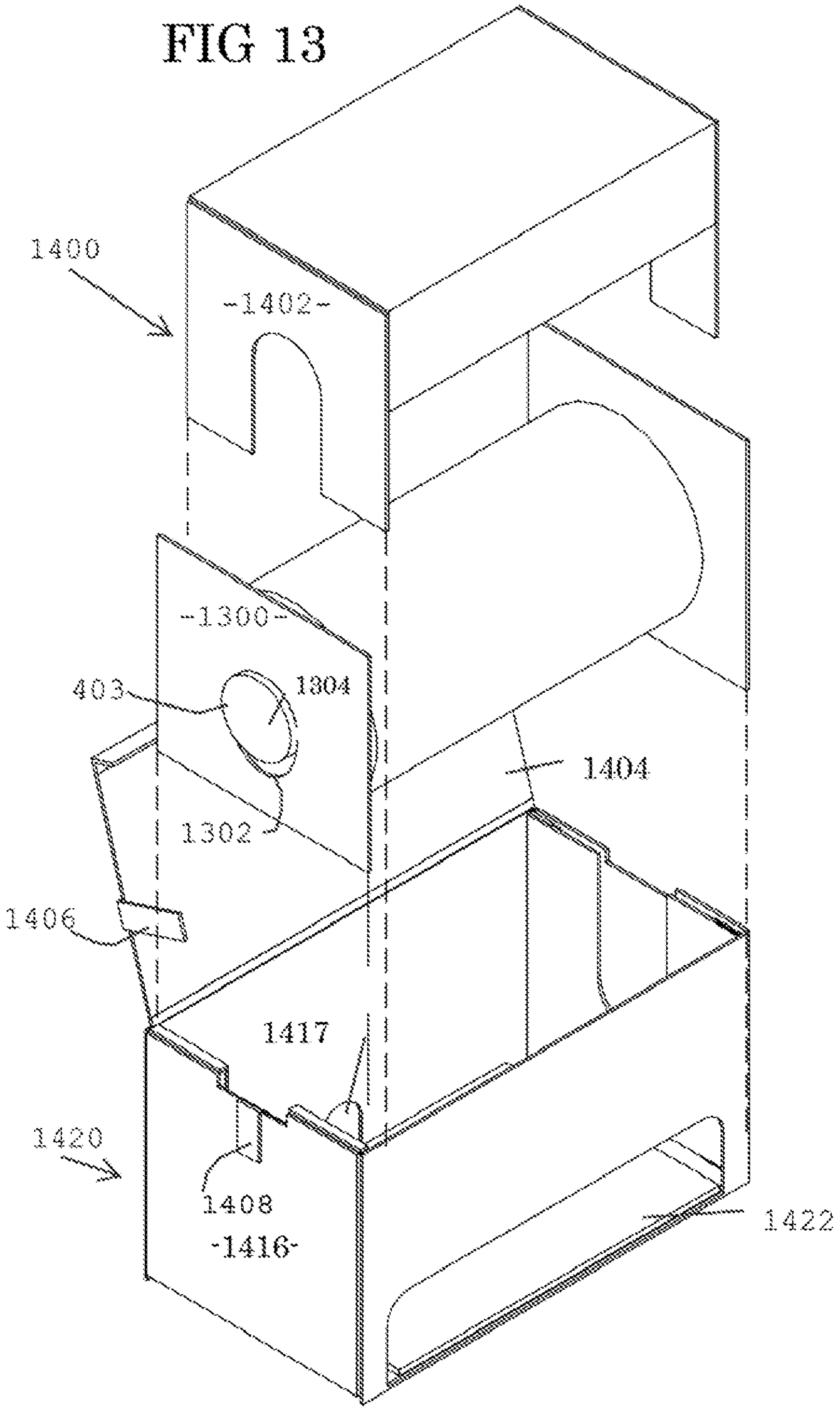
FIG. 13 is a perspective view of the assembled shipping box of FIG. 12 being prepared for shipment.

As shown in FIG. 13, after the shipping box 1420 is setup as discussed above, a tensioning panel 1300 (shown in FIG. 15) is fitted over a protrusion portion of the paper core 403 extending outward from the slit paper roll 402 and, in that state, the combined tensioning panel 1300, core 403 and roll 402, are lowered into the box 1420 as schematically shown in FIG. 13. In some preferred embodiments, in order to stabilize the roll 402 within the box 1420 during shipment, an upper packing member 1402 is placed over the slit paper roll 402 and extends in between the tensioning panels 1300 and the slit paper roll 402 in order to serve as a space filler to enhance stability (e.g., similar to the spacer 601 described in relation to the embodiments shown in FIGS. 1-11).

FIG. 13 also shows a perspective view of an illustrative paper roll 402 supported on a paper core 403 (i.e., in a similar manner to that shown in FIG. 9 of U.S. 2018/0222665). As shown, the core protrudes from the roll 402 at both ends, with protrusion portions extending through corresponding tensioning panels 1300. Although some embodiments could employ a single tensioning panel 1300 at one of the protrusion portions, some preferred embodiments will include two tensioning panels as shown, e.g., in FIG. 16. The at least one tensioning panel(s) 1300 is preferably positioned on the paper core projection 403 as shown in FIG. 16 prior to placing the slit paper roll 402 in the box, and is then lowered into the box and positioned adjacent the yoke panels 1407 and 1406 as shown in FIG. 14.

Figure 14:
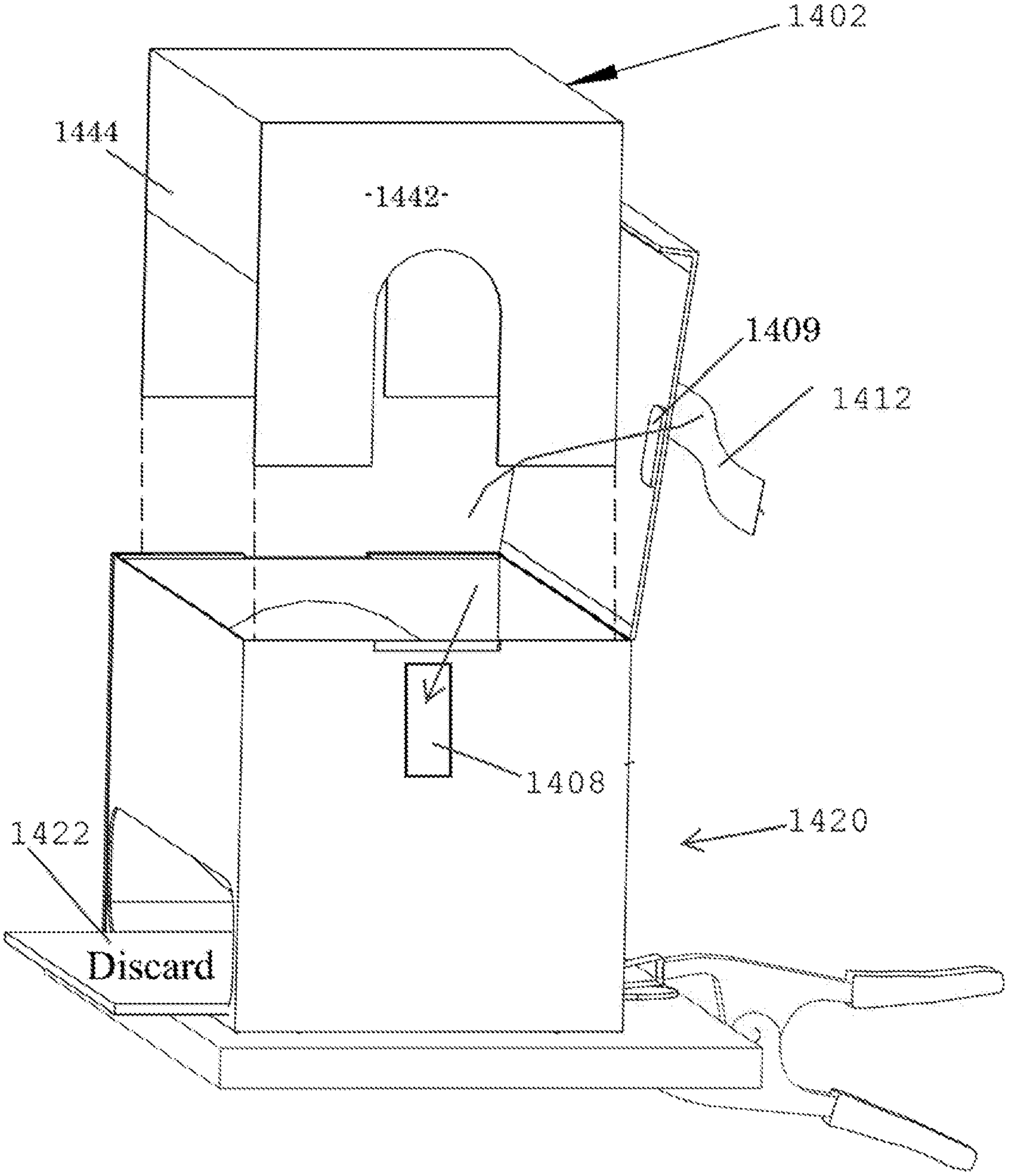
FIG. 14 is a perspective view of the assembled shipping box of FIG. 13 being prepared for use as an expander.

The assembly of the shipping and dispensing box shown in FIG. 14 illustrates the upper packing member generally as element 1402. In the assembled configuration, the side panels 1442 of the upper packing member 1402 are preferably inserted between the tensioning panel 1300 and the roll 402 of slit paper, thereby restricting lateral movement of the slit paper on the core 403. The opposing side panels 1444 (only one of which is shown in FIG. 14) also preferably are configured to fill the space between the roll of slit paper 402 and the interior walls of the box.

Figure 15:
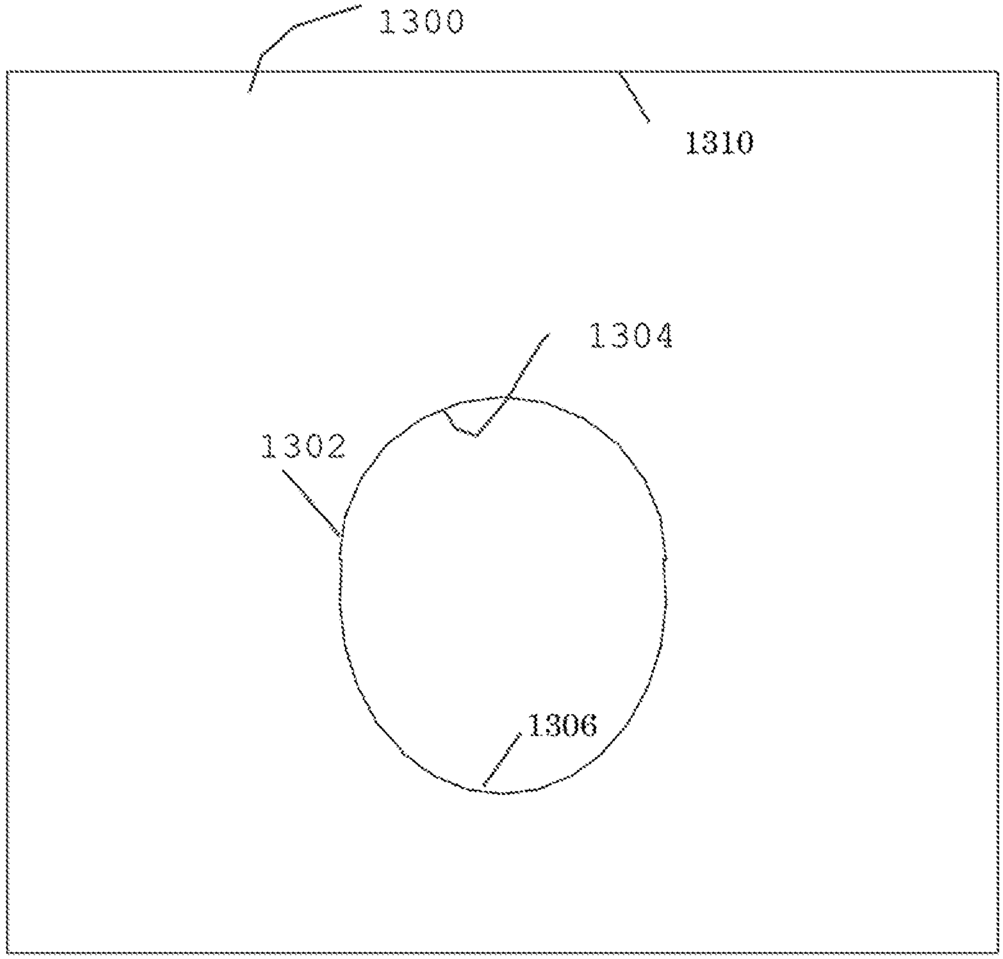
FIG. 15 is a plan view of a tensioning panel, showing an oblong opening in the panel.

In some preferred implementations, the pressure yolk 1300 shown in FIG. 15 has an oblong shaped opening, preferably an elongated oval shape as shown in FIG. 15. At least the edge 1304 of the oblong 1302 that contacts the core and applies pressure thereto is preferably arcuate, and preferably has an arcuate shape corresponding to the shape of the core 403. The opposing end 1306 of the oblong can also be arcuate but can any desired configuration since it is not in contact with the core 403 during the dispensing operation. The closed configuration of the oblong opening 1302 of the tensioning yoke 1300 prevents the tensioning yoke 1300 from accidentally being removed from the shipping box when the corrugated shipping padding 1402 is removed from the shipping box and discarded with the bottom padding 1422.

The optional bottom padding 1422 and the corrugated shipping padding 1402 are removed when the user is ready to draw and expand the slit sheet paper for wrapping around an object.

When the box is being used as a dispenser/expander of the slit sheet paper 402, variable pressure can be applied to the tensioning panel 1300 through the use of a releasable attachment system that pulls the cover member 1404 downward as needed. In some embodiments, the releasable attachment system can employ a strip with a releasable and resealable coating similar to that described above. As shown in FIG. 14, the releasable attachment system is preferably a hook and loop system such as sold under the trademark VELCRO™. In some examples, a strip of hook fabric 1412 is attached at one end to the top 1404 and a strip of loop fabric 1408 is attached to the side panel 1416. It should be understood that this arrangement can be reversed, as for example, the strip 1412 can be attached to the side panel 1416, and the strip 1408 can be attached to the top cover 1404. Either 1408 or 1412 can be a hook member and the loop member can be on the other of 1408 or 1412. Most preferably, the attachment system is positioned so that pressure is applied directly above the core member 403. Towards that end, in the illustrated embodiment, it is, thus, most preferable that the downward pressure on the tensioning panel 1300 is applied at substantially the midpoint of the edge 1310 of tension panel 1300. For example, in some embodiments, when the box is supported on a horizontal surface, in some embodiments, the releasable attachment system is at least partly located vertically above a region within a diameter of the core (i.e., such as to be directly above at least a portion of the core), and, in some preferred embodiments, the releasable attachment system includes at least a portion directly above substantially the central axis of the core.

Similar to the embodiment described above in relation to FIG. 11, during use of the box 1420 as an expander, to increase stability the box can optionally be clamped to a table or support structure as shown in FIG. 14.

In the preferred embodiments, to facilitate application of downward pressure at least one pressure tab 1409 (only one shown in FIG. 14) can be provided on the top cover panel 1404. In some preferred embodiments, the top cover tab(s) are equivalent to the top cover pad(s) 109 described above and shown in FIGS. 2, 5, and 6, and can be formed of similar materials. Moreover, although FIGS. 12-16 depict a releasable and resealable mechanism at one side of the box, in some embodiments, a similar mechanism can be employed at both sides of the box, in a like manner to that employed in the embodiment shown in, e.g., FIG. 5.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

In the present application, it should be understood that the use of any and all individual numerical values are stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue.

The amount of broadening from the strict numerical boundary depends upon many factors. For example, some of the factors which may be considered include the criticality of the element and/or the effect of a given amount of variation will have on the performance of the claimed subject matter, as well as other considerations known to those skilled in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre-and post-expansion, paper weights and type, as well as other considerations known to those skilled in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary.

Furthermore, it should be noted that in this application, all theories related to functioning of the invention are provided to facilitate appreciation of concepts of the invention, rather than by way of limitation.

Accordingly, a person of ordinary skill in the corresponding art related to a particular range, ratio or range of ratios will appreciate that such values are unambiguously derivable from the data presented herein.

What is claimed is:

1. A method, comprising:

(1) providing a combined shipping and expansion device for shipping a roll of unexpanded slit sheet paper and for expanding the slit sheet paper, including:

a) a container made with recyclable paper or board;

b) a roll of slit sheet paper wound around a core member and positioned within said container;

c) said roll of slit sheet paper having a slit pattern that forms open cells upon expansion;

d) said core member being made with recyclable paper or board and having a length greater than a width of said roll of slit sheet paper wound around the core member and having protrusions that extend beyond each side of said roll of slit sheet paper;

e) a plurality of yoke members within said container, including at least one yoke member that rotatably receives a first of said protrusions and at least one yoke member that rotatably receives a second of said protrusions; and f) said container having a dispensing opening through which the slit sheet paper wound around said core member can be extended and pulled, causing said core member to rotate relative to said yoke members via rotation of the roll of slit sheet paper;

wherein said combined shipping and expansion device is made substantially from recyclable paper or board materials, whereby after complete dispensing of the slit sheet paper from the shipping and expansion device, said combined shipping and expansion device can be recycled in a paper recycling facility;

(2) moving a movable panel of said container to a position resisting rotation of said roll of slit sheet paper;

(3) fixing said movable panel at said position resisting rotation of said roll of slit sheet paper; and (4) after said fixing said movable panel at said position resisting rotation of said roll of slit sheet paper, manually pulling the slit sheet paper outward through said dispensing opening and expanding the slit sheet paper.

2. The method of claim 1, further including:

shipping the combined shipping and expansion device prior to performing said manually pulling the slit sheet paper outward through said dispensing opening and expanding the slit sheet paper.

3. The method of claim 1, further including after fully dispensing the slit sheet paper from the container, delivering the combined shipping and expansion device to a paper recycling facility.

4. The method of claim 1, further including after fully dispensing the slit sheet paper from the container, disposing of the combined shipping and expansion device, whereby said combined shipping and expansion device is used as a single-use shipping and expansion device.

5. The method of claim 4, wherein said disposing of the combined shipping and expansion device includes delivering the combined shipping and expansion device to a paper recycling facility for recycling.

6. The method of claim 2, further including providing said container with an elongated tear-away region that covers said dispensing opening during said shipping, and further including removing said tear-away region prior to said manually pulling and expanding.

7. The method of claim 1, further including said movable panel resisting rotation of the roll of slit sheet paper by applying pressure resisting rotation of the roll of slit sheet paper.

8. The method of claim 7, further including adjustably increasing pressure by adjustably positioning the movable panel of said container.

9. The method of claim 1, wherein said movable panel of said container is a cover of the container and wherein said fixing said movable panel at said position includes fixing said cover at said position using a releasable affixing means.

10. The method of claim 9, wherein said releasable affixing means is a releasable adhesive.

11. The method claim 9, wherein said releasable affixing means is hook and loop fasteners.

12. The method of claim 2, further including stabilizing the roll of slit sheet paper during said shipping with at least one spacer located proximate said roll of slit sheet paper, and removing said at least one spacer prior to said manually pulling and expanding.

13. The method of claim 1, further including providing said slit sheet paper as expandable by applying an expansion force in a range from 0.15 to 0.22 pounds per inch to form at least one expanded sheet having an array of hexagonal cells.

14. The method of claim 1, further including providing the slit sheet paper with a paper having a weight in a range from about 30 to 40 pounds per 3,000 square feet.

15. The method of claim 1, further including, after said manually pulling the slit sheet paper outward through said dispensing opening and expanding the slit sheet paper, wrapping the expanded sheet paper around an object.

16. The method of claim 15, wherein the step of wrapping includes wrapping multiple layers of expanded slit sheet paper around the object.

17. The method of claim 16, further including placing the wrapped object in a separate shipping container.

18. The method of claim 1, further including providing said yoke members as respective yoke panels of said container.

19. The method of claim 1, further including providing said yoke members as made of recyclable paper or board.

20. The method of claim 18, further including providing said yoke panels contiguous with other panels of said container and folded adjacent to side panels of said container.

21. The method of claim 20, further including providing said yoke panels with extension tabs that are inserted within receiving slots in said container to secure the yoke panels adjacent to the side panels of said container.

22. The method of claim 20, further including providing said yoke panels as folded downwardly adjacent to the side panels of said container.

23. The method of claim 1, further including providing said container with an elongated tear-away region that covers said dispensing opening during shipping.

24. The method of claim 1, wherein said dispensing opening extends substantially across a front panel of said container, a bottom edge of said dispensing opening extends along a bottom panel of said container, an upper edge of said dispensing opening extends substantially parallel to said bottom edge, a left side edge of said dispensing opening is displaced inwardly from a left side panel of said container, a right side edge of said dispensing opening is displaced inwardly from a right side panel of said container, a first corner between said left side edge and said upper edge is curved, and a second corner between said right side edge and said upper edge is curved.

25. The method of claim 1, further including providing said core member as a hollow tube.

26. The method of claim 1, further including providing each of said yoke members with an opening having a radius of curvature that rotatably receives a respective one of said first and second protrusions.

27. The method of claim 26, wherein said first and second protrusions contact and are rotatably supported upon respective ones of said openings in said yoke members.

28. The method of claim 1, further including providing a plurality of double sided adhesive strips to adhere a bottom surface of said container to a table or support during use.

29. The method of claim 28, further including providing said double sided adhesive strips within said container in a covered state during shipping, whereby a user can uncover the double sided adhesive strips and attached the double sided adhesive strips to a bottom of the container and adhere the container to a table or support.

30. The method of claim 1, further including manually pulling the slit sheet paper outward through said dispensing opening as a single layer free of other layers being concurrently pulled outward through said dispensing opening.

31. The method of claim 30, further including providing said roll of slit sheet paper as the only roll of paper within said container.

32. The method of claim 1, wherein when said movable panel of said container is moved to said position resisting rotation of said roll of slit sheet paper, said movable panel applies a downward pressure against another panel below said movable panel, which another panel applies pressure inhiting rotation of said roll of slit sheet paper.

33. The method of claim 32, wherein when said movable panel of said container is moved to said position resisting rotation of said roll of slit sheet paper, said movable panel extends substantially horizontally and said another panel extends downwardly from said movable panel.

* * * * *